United States Patent

Tzikas et al.

[11] Patent Number: 4,754,023
[45] Date of Patent: Jun. 28, 1988

[54] REACTIVE DYESTUFFS COMPRISING A TRIAZINE MOIETY AND A VINYLSULFONYL MOIETY BOTH BEING LINKED BY A SUBSTITUTED ALKYLENE BRIDGE MEMBER

[75] Inventors: Athanassios Tzikas, Pratteln; Herbert Seiler, Riehen; Peter Scheibli, Bottmingen, all of Switzerland

[73] Assignee: Ciba-Geigy Corporation, Ardsley, N.Y.

[21] Appl. No.: 821,213

[22] Filed: Jan. 23, 1986

Related U.S. Application Data

[63] Continuation of Ser. No. 669,944, Nov. 9, 1984, abandoned.

[30] Foreign Application Priority Data

Nov. 9, 1983 [CH] Switzerland .................. 6035/83

[51] Int. Cl.$^4$ ............... C09B 62/04; C09B 62/06; C09B 62/10; C09B 62/08
[52] U.S. Cl. ................... 534/618; 534/582; 534/588; 534/598; 534/599; 534/617; 534/622; 534/627; 534/628; 534/629; 534/632; 534/634; 534/636; 534/637; 534/638; 534/641; 534/642; 534/887; 544/181; 544/194; 544/204; 544/208; 544/209; 544/210
[58] Field of Search ............... 534/618, 622, 628, 629, 534/638, 637, 642, 641, 617, 636, 634; 544/181, 194, 204, 208, 209, 210

[56] References Cited

U.S. PATENT DOCUMENTS

| 3,223,470 | 12/1966 | Boedeker et al. | 534/638 X |
| 3,234,205 | 2/1966 | Kuhne et al. | 534/629 X |
| 3,457,252 | 7/1969 | Meininger | 534/629 |
| 3,519,642 | 7/1970 | Wedemeyer et al. | 534/619 X |
| 3,526,617 | 9/1970 | Fuchs et al. | 534/629 |
| 3,544,547 | 12/1970 | Crabtree et al. | 534/638 X |
| 4,215,042 | 7/1980 | Buhler et al. | 534/629 X |
| 4,341,699 | 7/1982 | Tezuka et al. | 534/638 |
| 4,378,313 | 3/1983 | Kayane et al. | 534/638 |

FOREIGN PATENT DOCUMENTS

| 0070806 | 1/1983 | European Pat. Off. | 534/638 |
| 0070807 | 1/1983 | European Pat. Off. | 534/638 |
| 0070808 | 1/1983 | European Pat. Off. | 534/638 |
| 0085025 | 8/1983 | European Pat. Off. | 534/638 |
| 1576237 | 10/1980 | United Kingdom | 534/638 |

*Primary Examiner*—Floyd D. Higel
*Attorney, Agent, or Firm*—Wenderoth, Lind & Ponack

[57] ABSTRACT

A reactive dye of the formula

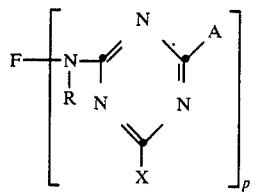

in which:
F is a radical selected from the group consisting of metal-free or metal-containing monoazo or disazo dyes containing at least one —SO$_3$H group, anthraquinone dyes, sulfophthalocyanine dyes, formazan dyes, phenazine dyes, oxazine dyes and nitroaryl dyes,
R is hydrogen, C$_1$–C$_4$ alkyl which is unsubstituted or substituted with —COOH or —SO$_3$H, cyanoethyl, or hydroxyethyl,
X is fluorine, chlorine, bromine, —SO$_3$H, phenylsulfonyl or C$_1$–C$_4$-alkylsulfonyl,
p is 1 or 2 and
A is a radical of the formula

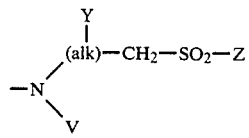

in which:
Y is chlorine, bromine, fluorine, —OH, —OSO$_3$H, —O-acyl, —CN, —COOH, —COO—C$_1$–C$_4$-alkyl, —CONH$_2$ or —SO$_2$—Z,
the group designated "alk" is a straight or branched polymethylene radical having 2 to 6 carbon atoms,
V is

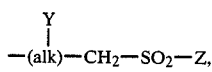

hydrogen or C$_1$–C$_4$-alkyl which is unsubstituted or substituted by C$_1$–C$_2$-alkoxy, carboxyl, sulfo, halogen or hydroxy,
Z is β-halogenoethyl, vinyl or β-acetoxyethyl, or A is a radical of the formulae

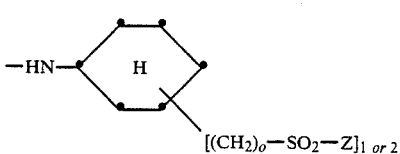

(Abstract continued on next page.)

-continued
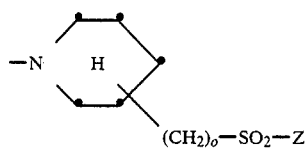
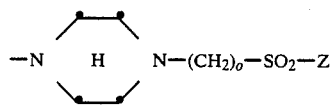
-continued
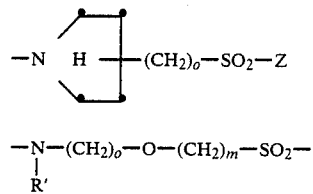
$-N-(CH_2)_o-O-(CH_2)_m-SO_2-Z$
 |
 R'
in all of which R' is $C_{1-6}$-alkyl or hydrogen, Z is as defined above, o is 0 to 6, and m is 2 to 6.
16 Claims, No Drawings

REACTIVE DYESTUFFS COMPRISING A TRIAZINE MOIETY AND A VINYLSULFONYL MOIETY BOTH BEING LINKED BY A SUBSTITUTED ALKYLENE BRIDGE MEMBER

This application is a continuation, of now abandoned application Ser. No. 669,944, filed Nov. 9, 1984 now abandoned.

The invention relates to novel useful reactive dyes of the formula I

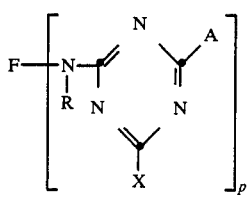

in which
F is a radical of a metal-free or metal-containing monoazo or disazo dye which contains at least one —SO₃H group, a radical of a derivative of 1-aminoanthraquinone or 1-anilinoanthraquinone, in particular a radical of a 4-phenylamino-1-aminoanthraquinone-2-sulfonic acid derivative or a radical of a sulfophthalocyanine dye, in particular of a derivative of a phthalocyaninesulfanilide or phthalocyaninesulfalkylamide having 2-6 C atoms in the alkyl chain and carrying at least two sulfo groups in the phthalocyanine nucleus, or a radical of a formazan, phenazine, oxazine or nitroaryl dye, R is hydrogen or —COOH— or —SO₃H-substituted or unsubstituted alkyl having 1 to 4 C atoms, cyanoethyl or hydroxyethyl, X is fluorine, chlorine, bromine, alkylsulfonyl having 1 to 4 C atoms, phenylsulfonyl or a —SO₃H radical, p is 1 or 2 and A is a radical of the formula II

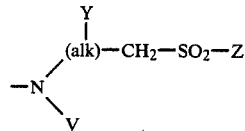

in which
Y is chlorine, bromine, fluorine, —OH, —OSO₃H, —O—acyl, —CN, —COOH, —COOalkyl having 1 to 4 C atoms in the alkyl radical, —CONH₂ or —SO₂Z, alk is a polymethylene radical having 1 to 6 C atoms or its branched isomers,

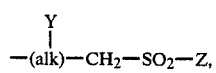

V is

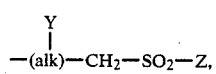

hydrogen, methyl or a methyl group which can be substituted by a carboxyl group or by a sulfo group or their derivatives or is an alkyl radical having 1 to 4 C atoms which can be substituted by alkoxy groups having 1 or 2 C atoms, by carboxyl or sulfo groups or by halogen atoms or hydroxyl groups, and in which Z is a β-halogenoethyl or a vinyl or β-acetoxyethyl radical, or a radical of the formulae II'

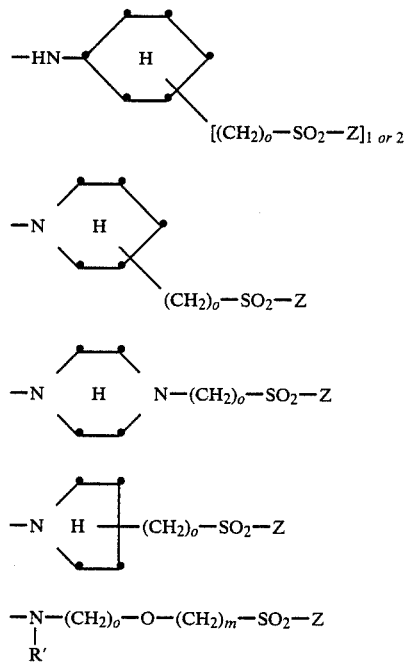

in all of which R' is C₁₋₆-alkyl or hydrogen, Z is as defined above, o is 0 to 6, and m is 2 to 6.

Fiber-reactive dyes are to be understood as meaning dyes which are capable of reacting with the hydroxyl groups of cellulose or with the reactive centers of natural or synthetic polyamides to form covalent chemical bonds. The radical F in the formula I can belong to any known class of dye, but it preferably belongs to the anthraquinone, the metal-free or metal-containing monoazo or disazo, the phthalocyanine, the formazan or the nitroaryl series. Preference is given to dyes according to the invention in which F is a dye radical of the anthraquinone, the metal-free or metal-containing monoazo or disazo or the phthalocyanine series.

F preferably contains two to four sulfo groups.

The substituent R is hydrogen or a straight-chain or branched low molecular weight alkyl group having 1 to 4 C atoms, such as methyl, ethyl, propyl, isopropyl, n-butyl, 2-methylpropyl, sec.-butyl, tert.-butyl, or a substituted alkyl radical, such as carboxymethyl, sulfomethyl, sulfoethyl, cyanoethyl, β-chloropropyl or β-hydroxyethyl.

R is preferably a methyl radical. R is particularly preferably hydrogen.

A substituent which is detachable in the form of an anion, X is in particular chlorine, bromine, fluorine, alkylsulfonyl, such as methylsulfonyl or ethylsulfonyl, phenylsulfonyl or a —SO₃H radical.

X is preferably a chlorine or fluorine atom.

An alkyl radical having 1 to 4 C atoms V is in particular a methyl group which can be substituted by a carboxyl group or a sulfo group or their derivatives or is an alkyl radical having 2 to 6 C atoms which can be substituted by alkoxy groups having 1 or 2 carbon atoms, by carboxyl or sulfo groups or by halogen atoms or hydroxyl groups or is an unsubstituted alkyl radical having 7 to 20 C atoms, a cyclohexyl radical or a phenyl radical which can be substituted by methyl, ethyl, methoxy, ethoxy, carboxyl or sulfo groups or by halogen atoms.

The invention relates in particular to dyes of the formula I in which Z is a β-chloroethyl radical and X is a halogen atom.

The reactive dyes of the general formula I are prepared by reacting a dye of the formula V

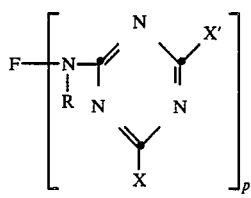
(V)

in which F, R and p are as defined above and X and X', independently of each other, are defined in the same way as X above, with an amine of the formula IIa

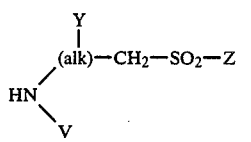
(IIa)

in which alk, Y, Z and V are as defined above, or with an amine of the formulae II'a

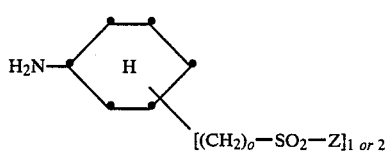

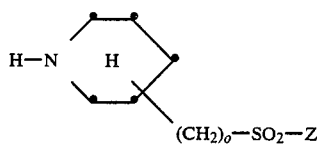

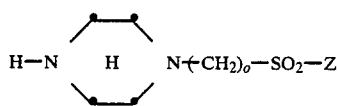

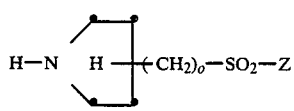

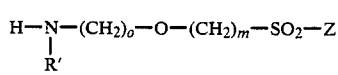

in which Z and R' are as defined above, o is 0 to 6, and m is 2 to 6.

Dyes of the general formula V are prepared by reacting a dye of the formula III

(III)

in which F, R and p are as defined above, with a reactive derivative of the 1,3,5-triazine of the formula IV

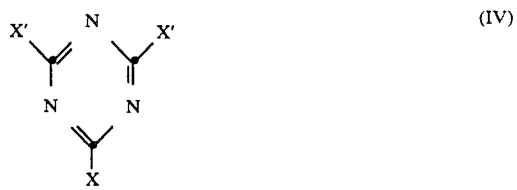
(IV)

in which X and X', independently of each other, are defined in the same way as X above.

The preparation of dyes of the formula V and of novel reactive dyes of the formula I can also be advantageously combined with each other, so that first of all a dye of the formula III is reacted with a reactive derivative of the 1,3,5-triazine of the formula IV to give a dye of the formula V, which, without prior isolation, is then reacted with an amine of the formula IIa or II'a to give a novel reactive dye of the formula I. The reaction of the dyes of the formula III with the triazine derivatives of the formula IV is advantageously carried out at low temperatures, for example at between $-2°$ and $+10°$ C., preferably between 0° and 5° C., in the presence of acid-binding agents, such as sodium hydroxide solution, sodium carbonate or sodium hydrogencarbonate, within a pH range between 1.5 and 9, preferably between 4 and 6.

The solvent is preferably water which contains a certain amount of organic solvents, such as acetone. The reaction can also be carried out in pure water.

For the subsequent reaction of the dyes of the formula V thus obtained with the amines of the formula IIa or II'a, the amines are advantageously used in the form of a salt, preferably in the form of the hydrochloride. The reaction is carried out at elevated temperatures, for example at between 5° and 70° C., preferably between 5° and 30° C., in the presence of acid-binding agents, preferably sodium bicarbonate, within a pH range from 2 to 6.5, preferably 3.5 to 4.5.

When the dye radical F is composed of a plurality of components, as for example in the case of azo dyes or formazan dyes, the novel dyes of the formula I can also be obtained by synthesizing them in a manner known per se from components of F of which one or even two contain a group of the formula Va

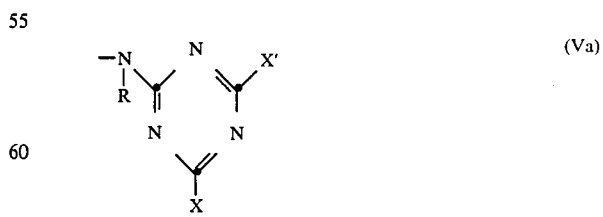
(Va)

in which R, X and X' are as defined above.

Components of this type are obtained by acylating, with a reactive triazine derivative of the formula IV, the corresponding components containing a group of the formula IIIa $$-\underset{\underset{R}{|}}{N}-H \qquad \text{(IIIa)}$$

under conditions which correspond to those described above for the corresponding reaction of the dye. The dyes thus obtained are then reacted in the manner described above with an amine of the formula IIa or II'a to give a novel dye having the formula I.

The amines of the formula IIa or II'a in which Z is a β-halogenoethyl radical are prepared by reacting an amine of the formula IIa or II'a which contains a chlorine atom in place of the —SO₂—Z group with β-hydroxyethylmercaptan in an alkaline medium and subsequently oxidizing the resulting thioether in line with the teaching of German Pat. No. 887,505 with halogen in a hydrohalic acid solution. Amines of the formula IIa or II'a in which Z is a vinyl radical can be obtained by elimination of hydrogen chloride from amines of the formula IIa or II's in which Z is β-halogenoethyl.

The novel dyes of the formula I in which Z is vinyl can be analogously obtained by eliminating hydrogen chloride, for example by treatment at 50° to 60° C. with sodium hydrogen-carbonate in water, from novel dyes of the formula I in which Z is β-chloroethyl.

Reactive derivatives of the 1,3,5-triazine of the formula IV are known. Examples are: trichlorotriazine, tribromotriazine, trifluorotriazine, trisulfotriazine, tris-methylsulfonyltriazine, tris-ethylsulfonyltriazine, dichlorofluorotriazine, chlorodisulfotriazine, chloro-bis-methylsulfonyltriazine and trisphenylsulfonyltriazine.

Examples of amines of the formula IIa are: β-carboxy-β-(β'-chloroethylsulfonyl)-ethylamine hydrochloride, β-ethoxycarbonyl-β-(β'-chloroethylsulfonyl)-ethylamine hydrochloride, β-hydroxy-γ-(β'-chloroethylsulfonyl)-propylamine hydrochloride, β,γ-bis-β'-chloroethylsulfonyl)propylamine hydrochloride, β-acetoxy-γ-(β'-Petoxyethylsulfonyl)propylamine hydrochloride, β-chloro-γ-(β'-chloroethylsulfonyl)propylamine hydrochloride, β-bromo-γ-(β'-chloroethylsulfonyl)propylamine hydrochloride, β-sulfato-γ-(β'-sulfatoethylsulfonyl)propylamine hydrochloride, bis-[β-hydroxy-γ-(β'-chloroethylsulfonyl)-propyl]-amine hydrochloride, bis-[β-chloro-γ-(β'-chloroethylsulfonyl)-propyl]-amine hydrochloride, bis-[β-sulfato-γ-(β'-sulfatoethylsulfonyl)-propyl]-amine hydrochloride, β-hydroxy-γ-(β'-vinylsulfonyl)-propylamine hydrochloride,

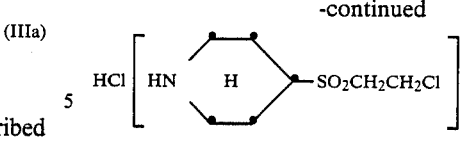

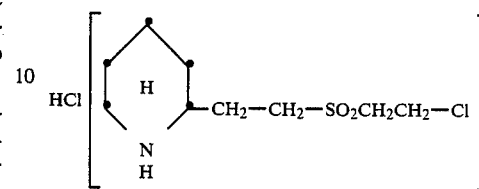

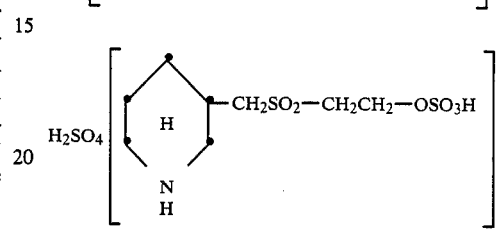

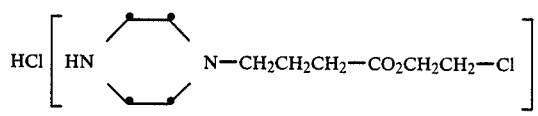

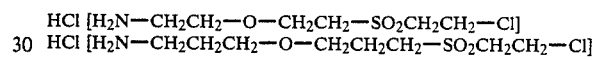

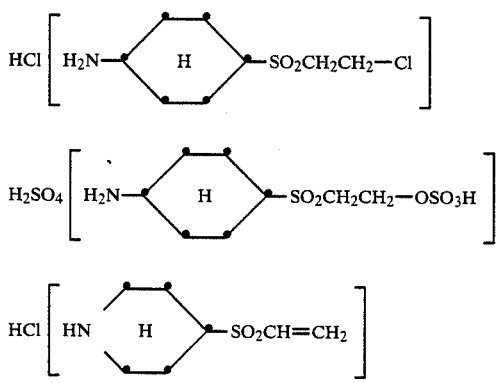

HCl [H₂N—CH₂CH₂—O—CH₂CH₂—SO₂CH₂CH₂—Cl]
HCl [H₂N—CH₂CH₂CH₂—O—CH₂CH₂CH₂—SO₂CH₂CH₂—Cl]

In the dyes of the formula III which are used for preparing dyes according to the invention, F is the radical of at least one water-soluble dye carrying at least one sulfo group, in particular the radical of a monoazo or disazo dye which can be metal-free or metallized, the radical of a derivative of 1-aminoanthraquinone or 1-anilinoanthraquinone, in particular the radical of a 4-phenylamino-1-aminoanthraquinone-2-sulfonic acid derivative or the radical of a sulfophthalocyanine dye, in particular of a derivative of a phthalocyaninesulfanilide or phthalocyaninesulfalkylamide having 2 to 6 carbon atoms in the alkyl chain which carries at least two sulfo groups in the phthalocyanine nucleus, or a radical of a formazan or nitroaryl dye.

In an important group of dyes of the formula III, F is the radical of a monoazo or disazo dye of the formula VIa or VIb $$D-N=N-(M-N=N)_nK- \qquad \text{(VIa)}$$

or $$-D-N=N-(M-N=N)_nK \qquad \text{(VIb)}$$

or of a metal complex derived therefrom, where in the formulae VIa and VIb

D is the radical of a diazo component of the benzene or naphthalene series which can be substituted by substituents customary in azo chemistry, in particular by hydroxyl, methyl, ethyl, methoxy or ethoxy groups, substituted or unsubstituted alkanoylamino groups having 2 to 4 C atoms, substituted or unsubstituted benzoylamino groups or halogen atoms, K is the radical of a coupling component of the benzene, naphthalene, pyrazolone, 6-hydroxypyrid-2-one or acetoacetarylamide series which can be substituted by substituents customary in azo chemistry, in particular by hydroxyl, amino, methyl, ethyl, methoxy or ethoxy groups, substituted or unsubstituted alkanoylamino group having 2 to 4 C atoms, substituted or unsubstituted benzoylamino groups or halogen atoms, M is the radical of a middle component of the benzene or naphthalene series which can be substituted by substituents customary in azo chemistry, in particular by hydroxyl, methyl, ethyl, methoxy or ethoxy groups, substituted or unsubstituted alkanoylamino groups having 2 to 4 C atoms, substituted or unsubstituted benzoylamino groups or halogen atoms, n is 0 or 1, and D, M and K together contain at least two sulfo groups, preferably three or four sulfo groups.

In a further useful group of dyes of the formula III in which p is 2, F is the divalent radical of the formula VIc $$-D-N=N-(M-N=N)_nK- \qquad (VIc)$$

in which D, K, M and n are as defined above, or is a metal complex derived therefrom.

The dyes of the formula III in which F is a radical of one of the formulae VIa to VIc, in the event that n is 0, can be obtained in a manner known per se by diazotizing a suitable aromatic amine and coupling the diazonium compound onto suitable coupling components, either the diazo component or the coupling component or both containing a radical of the formula

or the coupling component contains a radical of the formula

and the acyl group is split off after the coupling by hydrolysis.

To prepare disazo dyes of the formula III in which F is a radical of one of the formulae VIa–VIc and n is 1, the first step is to couple the diazonium compound of a suitable aromatic amine onto a suitable middle component. The middle component can in principle be any benzene or naphthalene derivative which contains a diazotizable amino group. Thereafter the then existent aminoazo compound is diazotized and coupled onto a suitable coupling component, either the diazo component of the first coupling or the coupling component of the second coupling or both containing a radical of the formula

and the acyl group is split off after the coupling by hydrolysis. The coupling component can also contain a

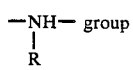

in place of the

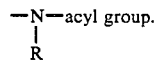

Examples of suitable diazo components for preparing dyes of the formula III in which F is a radical of the formula VIa are the aromatic amines contained in the following list No. 1.

A List No. 1

Anilin; o-, m- or p-toluidine;
o-, m- or p-anisidine; o-, m- or p-chloroaniline;
aniline-2-, -3- or -4-carboxylic acid or -sulfonic acid;
aniline-2,4- or -2,5-dicarboxylic acid or -disulfonic acid;
2-aminophenol-4-sulfonic acid;
2-aminophenol-4,6-disulfonic acid;
4-chloro-2-aminophenol-5- or -6-sulfonic acid;
6-chloro-2-aminophenol-4-sulfonic acid;
6-nitro-2-aminophenol-4-sulfonic acid;
4-nitro-2-aminophenol-6-sulfonic acid;
3- or 4-acetylaminoaniline-6-sulfonic acid;
3- or 4-benzoylaminoaniline-6-sulfonic acid;
4-amino-4'-sulfobenzanilide;
2-aminoanisole-4-sulfonic acid;
4-aminoanisole-2- or -3-sulfonic acid;
3-aminoanisole-4-sulfonic acid;
6-chloro-2-aminobenzenesulfonic acid;
5-nitro-2-aminobenzenesulfonic acid;
4-chloro-3-aminobenzenesulfonic acid;
6-chloro-3-aminobenzenesulfonic acid;
3-chloro-4-aminobenzenesulfonic acid;
2-aminotoluene-4-sulfonic acid;
2-aminotoluene-5-sulfonic acid;
3-aminotoluene-6-sulfonic acid;
4-aminotoluene-2-sulfonic acid;
4-aminotoluene-3-sulfonic acid;
5-chloro-2-aminotoluene-3-sulfonic acid;
3-chloro-2-aminotoluene-5-sulfonic acid;
2-chloro-4-aminotoluene-6-sulfonic acid;
3-nitro-2-aminotoluene-5-sulfonic acid;
3-nitro-4-aminotoluene-2-sulfonic acid;
3-amino-1,2-dimethylbenzene-4-sulfonic acid;
4-amino-1,3-dimethylbenzene-5-sulfonic acid;
4-amino-1,3-dimethylbenzene-6-sulfonic acid;
4-chloro-2-aminoanisole-5-sulfonic acid;
4-aminophenetole-2-sulfonic acid;
4-aminophenetole-3-sulfonic acid;
2-aminophenetole-4-sulfonic acid;
2-aminotoluene-3,4-disulfonic acid;
2-aminotoluene-3,5-disulfonic acid;
4-amino-2-sulfo-2'- or 4'-methoxydiphenylamine;
2-aminodiphenyl ether; 2-, 3- or 4-aminobenzenesulfamide;
2-naphthylamine-1-, -5-, -6-, -7- or -8-sulfonic acid;
2-naphthylamine-1,5-, -1,7-, -3,6-, -3,7-, -4,7-, -4,8-, -5,7- or -6,8-disulfonic acid;
2-naphthylamine-1,5,7-, -3,6,8- or -4,6,8-trisulfonic acid;
1-naphthylamine-2-, -4-, -5-, -6- or -7-sulfonic acid;
1-naphthylamine-3,6-, -3,7-, -3,8-, -4,6-, -4,7-, -4,8-, -5,7- or -6,8-disulfonic acid;
1-naphthylamine-2,3,6-, -3,6,8- or -4,6,8-trisulfonic acid;
2-amino-1-naphthol-4-sulfonic acid;
2-amino-1-naphthol-7-sulfonic acid;
1-amino-2-naphthol-4-sulfonic acid;
4-nitro-2-amino-1-naphthol-7-sulfonic acid and
5-nitro-1-amino-2-naphthol-4-sulfonic acid, and amines of the formulae

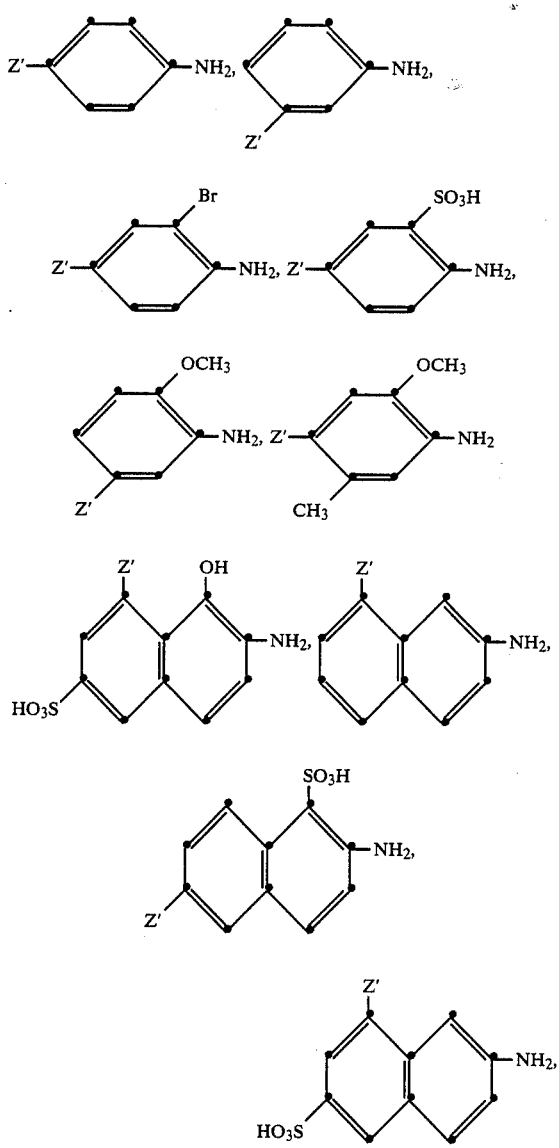

in which Z' is vinylsulfonyl, -chloroalkylsulfonyl, -sulfatoethylsulfonyl -thiosulfatoethylsulfonyl or -acetoxyethylsulfonyl or of the formulae

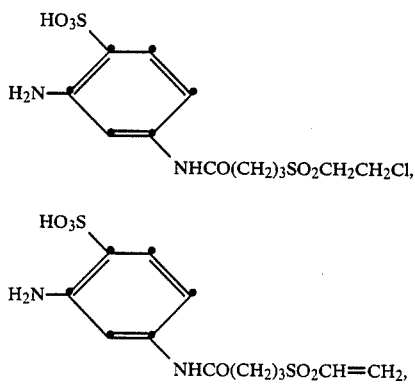

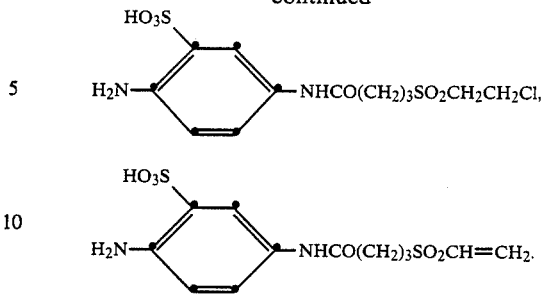

In the synthesis of dyes of the formula III in which F is a radical of the formula VIb or VIc, for example the diamines given in list No. 2 are used in the form of their monoacyl derivatives. Suitable acyl groups are in particular lower alkanoyl groups having 1 to 5 C atoms, preferably formyl or acetyl. As stated above, the acyl groups are split off after the coupling in order to obtain dyes of the formula III.

List No. 2 p-Phenylenediamine;
1,4-phenylenediamine-2-sulfonic acid;
1,4-phenylenediamine-2-carboxylic acid;
1,4-diaminonaphthalene-2-sulfonic acid;
2,6-diaminonaphthalene-8-sulfonic acid;
2,6-diaminonaphthalene-4,8-disulfonic acid;
1,6-diaminonaphthalene-4,8-disulfonic acid;
m-phenylenediamine,
1,3-phenylenediamine-4-sulfonic acid;
1,3-phenylenediamine-4,6-disulfonic acid;
1,4-phenylenediamine-2,6-disulfonic acid;
1,4-phenylenediamine-2,5-disulfonic acid;
1,4-diaminonaphthalene-6-sulfonic acid;
4,4'-diaminodiphenyl-3-sulfonic acid;
4,4'-diaminostilbene-2,2'-disulfonic acid;

Examples of middle components which can be involved in the synthesis of the radicals VIa to VIc are given in the following list No. 3.

List No. 3

Aniline; m-toluidine;
2,5-dimethylaniline, 2,5-dimethoxyaniline;
m-aminoanisole; m-acetylaminoaniline,
m-propionylaminoaniline, m-butyrylaminoaniline or m-benzoylaminoaniline;
m-aminophenylurea;
4-acetamino-2-aminotoluene or 2-aminoanisole;
2-amino-4-methylanisole;
1-aminonaphthalene-6- or -7-sulfonic acid;
4-amino-4-acetylaminobenzenesulfonic acid;
2-amino-5-naphthol-7-sulfonic acid;
2-amino-8-naphthol-6-sulfonic acid;
2-(4-aminobenzoylamino)-5-naphthol-7-sulfonic acid;
1-(4-amino-2-sulfophenyl)-3-methylpyrazol-5-one or -3-carboxypyrazol-5-one;
acetoacet-3-sulfo-4-aminoanilide.

Examples of coupling components which are suitable for preparing dyes of the general formula III in which F is a group of the formula VIb are given in the following list No. 4.

List No. 4

2-Naphthol; 2-naphthol-6-, -7- or -8-sulfonic acid;
2-naphthol-3,6-, -3,7-, -4,8- or -6,8-disulfonic acid;

2-naphthol-3,6,8-trisulfonic acid;
1-naphthol-4-, -5-, -6- or -8-sulfonic acid;
1-naphthol-3,6-, -3,7-, -3,8- or -4,8-disulfonic acid;
1-naphthol-3,6-, -3,7-, -3,8- or -4,8-disulfonic acid;
1-naphthol-3,6,8-trisulfonic acid;
2-naphthylamine-5-, -6- or -7-sulfonic acid;
2-naphthylamine-3,6-, -3,7-, -5,7- or -6,8-disulfonic acid;
1-amino-8-naphthol-2,4-disulfonic acid;
2-ureido-5-naphthol-7-sulfonic acid;
1-(4-sulfophenyl)-3-methylpyrazol-5-one or -3-carboxypyrazol-5-one;
1-(4-methyl-2-sulfophenyl)-3-methylpyrazol-5-one or -3-carboxypyrazol-5-one;
1-(2,5-dichloro-4-sulfophenyl)-3-methylpyrazol-5-one or -3-carboxypyrazol-5-one;
4-acetoacetylaminobenzenesulfonic acid;
4-acetoacetylamino-3,6-dimethoxybenzenesulfonic acid; barbituric acid;
6-hydroxy-4-methyl-3-sulfopyrid-2-one or -3-carboxamidopyrid-2-one.

Examples of coupling components which are suitable for synthesizing dyes of the formula III in which F is a group of the formula VIa or VIc are given in the following list No. 5.

List No. 5

Aniline; m-toluidine; 2,5-dimethylaniline or -dimethoxyaniline;
m-aminoanisole; m-acetylaminoaniline, m-propionylaminoaniline, m-butyrylaminoaniline or m-benzoylaminoaniline;
m-aminophenylurea;
4-acetamino-2-aminotoluene or -2-aminoanisole;
2-amino-4-methylanisole;
1-aminonaphthalene-6-, -7- or -8-sulfonic acid;
2-amino-4-acetylaminobenzenesulfonic acid;
2-amino-5-naphthol-7-sulfonic acid;
2-amino-8-naphthol-6-sulfonic acid;
1-(4-aminobenzoylamino)-5-naphthol-7-sulfonic acid;
1-(4-amino or 4-acetylamino)-2-sulfophenyl-3-methyl-pyrazol-5-one or -3-carboxypyrazol-5-one;
acetoacet-3-sulfo-4-aminoanilide;
1-amino-8-naphthol-3,6- or -4,6-disulfonic acid;
1-(3- or 4-aminobenzoyl)-amino-8-naphthol-3,6- or -4,6-disulfonic acid;
1-acetylamino-8-naphthol-3,6- or -4,6-disulfonic acid;
2-acetylamino-5-naphthol-7-sulfonic acid;
2-acetylamino-8-naphthol-6-sulfonic acid;
1-(3-amino- or 3-acetylamino-6-sulfophenyl)-3-methyl-pyrazol-5-one or -3-carboxypyrazol-5-one;
2-acetylmethylamino- or 2-methylamino-5-naphthol-7-sulfonic acid;
N-methylaniline; N-propyl-m-toluidine.

Disazo dyes which carry one or two

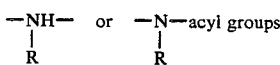

and are suitable for preparing reactive dyes according to the invention can also be obtained by tetrazotizing an aromatic diamine containing two primary amino groups and coupling the tetrazo compound thus obtained with 2 mole equivalents of a coupling component containing a

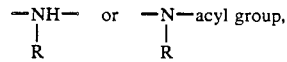

for example with one of those coupling components given in List 5, or with 1 mole equivalent each of two different such coupling components or with 1 mole equivalent of such a coupling component and with 1 mole equivalent of a coupling component which does not contain a

for example with one of those coupling components given in List 4. Examples of aromatic diamines of this type are:

List No. 6

3,3'-Dimethoxybenzidine,
benzidine-2,2'-disulfonic acid,
benzidine-3,3'-dicarboxylic acid,
benzidine-3,3'-diglycolic acid and
4,4'-diaminostilbene-2,2'-disulfonic acid.

Further disazo dyes which carry one or two

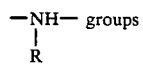

and are suitable for preparing reactive dyes according to the invention can be obtained by coupling either 2 mole equivalents of a diazotized amine carrying an

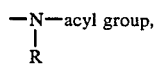

for example of an acyl derivative of one of the amines of List 2, or 1 mole equivalent of one of these diazotized amines and 1 mole equivalent of a diazotized amine which does not carry a

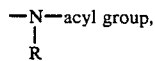

for example one of the amines of List 1, onto a coupling component which can be coupled twice, and then hydrolyzing the resulting dyes. If 2 moles equivalents of an amine carrying a

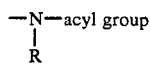

are used, it is possible to use either 2 mole equivalents of the same amine or 1 mole equivalent each of two different amines.

Examples of coupling components which can be coupled twice are 1-amino-8-naphthol-3,6- or -4,6-disulfonic acid, resorcinol and 5,5'-dihydroxy-7,7'-disulfo-2,2'-dinaphthylurea.

The dyes of the formula III can be obtained in perfect analogy to the preparative methods described above by using compounds which contain a nitro group in place of the

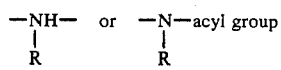

in place of the diazo and coupling components given in lists 2, 3 and 5, and reducing the nitro group of the azo compounds built up from these components to the amino group. The conditions for this reduction are known per se. A reducing agent known for this purpose is alkali metal sulfide, which reduces the nitro group at temperatures of 40° to 70° C. in an aqueous medium without attacking the azo group.

Examples of monoazo and disazo dyes which are particularly useful for the radicals F and suitable for preparing dyes according to the invention are reproduced by the following formulae in which the benzene and naphthalene nuclei can be substituted in accordance with the explanations given for D, M and K and the position of the radical of the formula IIIa is indicated by the unoccupied bond:

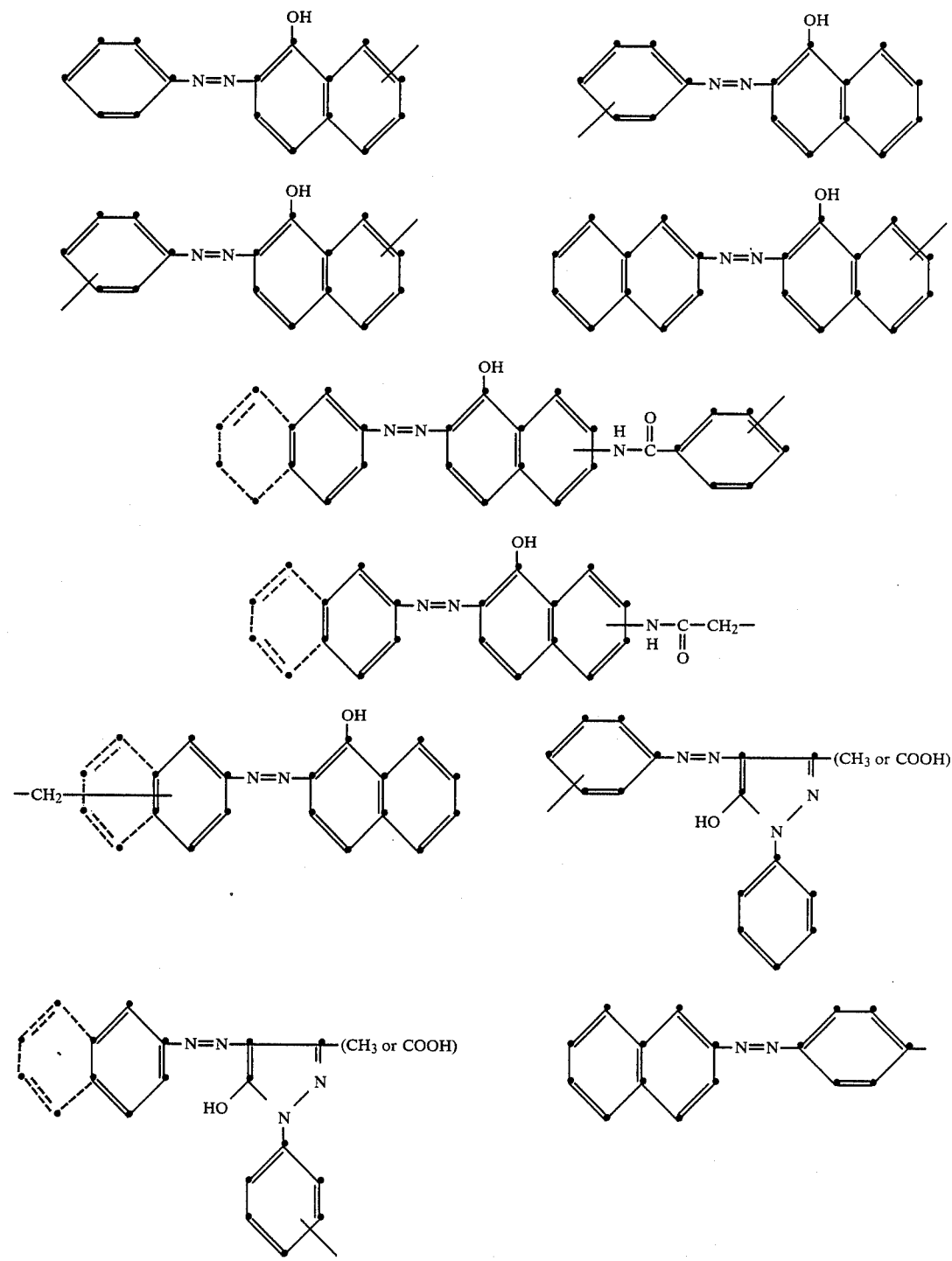

-continued

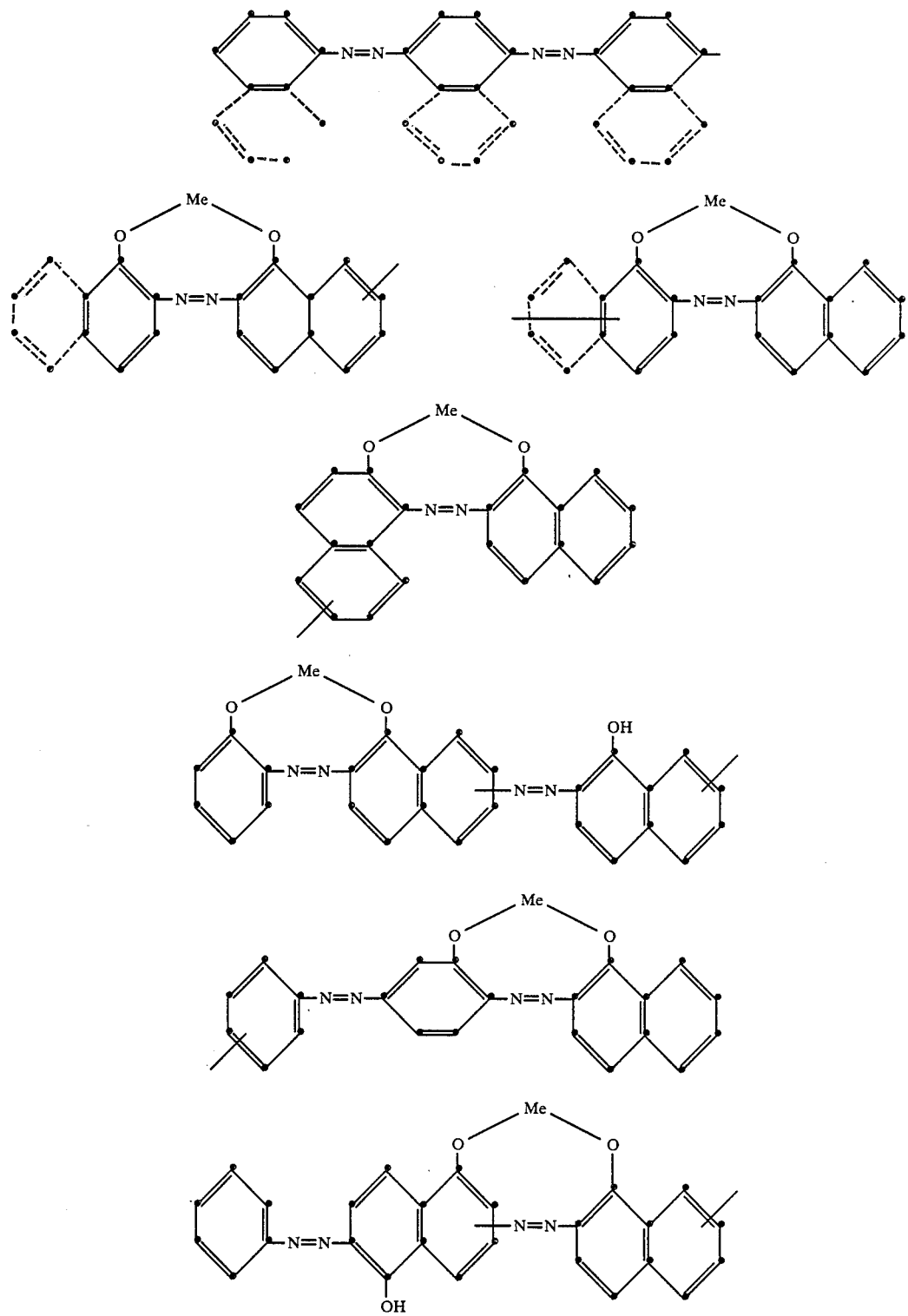

Examples of diazo components from which particularly useful monoazo dyes of the formula III can be prepared are:
aniline-2-sulfonic acid;
aniline-2,5-disulfonic acid;
2-naphthylamine-1-sulfonic acid;
2-naphthylamine-1,5-disulfonic acid;
2-naphthylamine-4,8-disulfonic acid;
2-naphthylamine-3,6,8-trisulfonic acid;
2-naphthylamine-4,6,8-trisulfonic acid.

Examples of coupling components from which particularly useful monoazo dyes can be prepared are:
1-amino-8-naphthol-3,6-disulfonic acid;
1-amino-8-naphthol-4,6-disulfonic acid;

2-amino-5-naphthol-7-sulfonic acid;
1-(4-amino-2-sulfophenyl)-3-carboxypyrazol-5-one;
1-(5-amino-2-sulfophenyl)-3-carboxypyrazol-5-one;
aniline; N-methylaniline; 3-aminotoluene;
3-aminoacetanilide; 3-aminophenylurea.

Examples of particularly useful monoazo dyes of the formula III are:

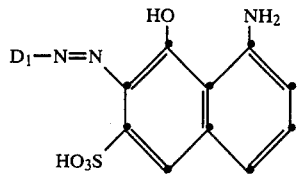

in which $D_1$ is a 2-sulfophenyl, 1-sulfo-2-naphthyl or 1,5-disulfo-2-naphthyl radical and the coupling component is substituted in the 3- or 4-position by a further sulfo group.

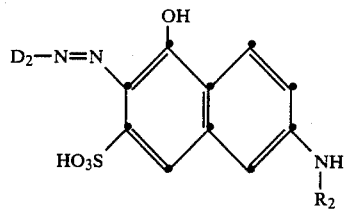

in which $D_2$ is a 2-sulfophenyl, 2,5-disulfophenyl or 1,5-disulfo-2-naphthyl radical, the coupling component carries no further substituents, and $R_2$ is hydrogen or methyl.

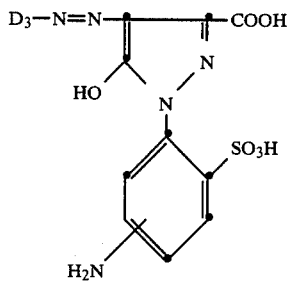

in which $D_3$ is a 2-sulfophenyl or 1-sulfo-2-naphthyl radical and the amino group in the 2-sulfophenyl nucleus of the coupling component is in the 4- or 5-position.

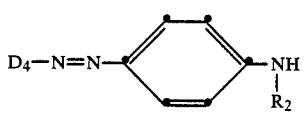

in which $D_4$ is a 2,5-disulfophenyl, 4,8-disulfo-2-naphthyl, 3,6,8-trisulfo-2-naphthyl or 4,6,8-trisulfo-2-naphthyl radical, the coupling component in the o-position relative to the azo group can be substituted by a methyl group, an acetamino group or a urea radical, and R is hydrogen or methyl.

Examples of individual dyes of the formula III in which F is a radical of a monoazo or disazo dye are:

1-(3'-aminobenzoylamino)-8-hydroxy-7-(2'-sulfophenylazo)naphthalene-3,6-disulfonic acid,
1-(4'-aminobenzoylamino)-8-hydroxy-7,2'-azonaphthalene-1',3,5',6-tetrasulfonic acid, 1-amino-8-hydroxy-7,2'-azonaphthalene-1',4,6-trisulfonic acid,
1-(aminoacetylamino)-8-hydroxy-7,2'-azonaphthalene-1',3,5',6-tetrasulfonic acid,
2-methylamino-5-hydroxy-6,2'-azonaphthalene-1',5',7-trisulfonic acid,
2-amino-8-hydroxy-7,2'-azonaphthalene-1',6-disulfonic acid,
2-methylamino-8-hydroxy-7,2'-azonaphthalene-1',6,5'-trisulfonic acid,
2-amino-5-hydroxy-6-(2',5'-disulfophenylazo)-naphthalene-7-sulfonic acid,
2-methylamino-5-hydroxy-6-(4'-methoxy-2'-sulfophenylazo)-naphthalene-7-sulfonic acid,
1-amino-8-hydroxy-7-(2'-sulfophenylazo)-naphthalene-3,6-disulfonic acid,
1-amino-8-hydroxy-7-(4'-chloro-2'-sulfophenylazo)-naphthalene-4,6-disulfonic acid,
2-(4'-amino-2'-methylphenylazo)-naphthalene-4,8-disulfonic acid,
2-(4'-amino-2'-methylphenylazo)-naphthalene-4,6,8-trisulfonic acid,
2-(4'-amino-2'-acetylaminophenylazo)-naphthalene-5,7-disulfonic acid,
2-(4'-amino-2'-acetylaminophenylazo)-naphthalene-3,6,8-trisulfonic acid,
4-nitro-4'-(4''-methylaminophenylazo)-stilbene-2,2'-disulfonic acid,
4-nitro-4'-(4''-amino-2''-methyl-5''-methoxyphenylazo)-stilbene-2,2'-disulfonic acid,
1-(2',5'-dichloro-4'-sulfophenyl)-3-methyl-4-(3''-amino-6''-sulfophenylazo)-5-pyrazolone,
1-(4'-sulfophenyl)-3-carboxy-4-(4''-amino-2''-sulfophenylazo)-5-pyrazolone,
1-(2'-methylphenyl)-3-methyl-4-(4''-amino-2'',5''-disulfophenylazo)-5-pyrazolone,
1-(2-sulfophenyl)-3-methyl-4-(3''-amino-6''-sulfophenylazo)-1-(2'-5-pyrazolone,
2-(3'-sulfophenylamino)-5-hydroxy-6-(4'-amino-2'-sulfophenylazo)-naphthalene-7-sulfonic
1-(3'-aminophenyl)-3-methyl-4-(2'',5''-disulfophenylazo)-5-pyrazolone,
1-(3'-amino-6'-sulfophenyl)-3-carboxy-4-(2'-sulfophenylazo)-5-pyrazolone,
1-(4'-amino-2'-sulfophenyl)-3-carboxy-4-(2'-sulfophenylazo)-5-pyrazolone,
1-(4'-amino-2'-sulfophenyl)-3-carboxy-4-[4''-(2''',5'''-disulfophenylaz
the copper complex of 1-amino-8-hydroxy-7-(2'-hydroxy-5'-sulfophenylazo)-naphthalene-3,6-disulfonic acid,
the copper complex of 2-amino-5-hydroxy-6-(2'-hydroxy-3'-sulfo-5'-nitrophenylazo)-naphthalene-7-sulfonic acid,
the copper complex of 1-amino-8-hydroxy-7-(2'-hydroxy-3'-chloro-5'-sulfophenylazo)-naphthale-b 3,6-disulfonic acid,
the copper complex of 2-methylamino-5-hydroxy-6-(2'-carboxy-5'-sulfophenylazo)-naphthalene-7-sulfonic acid,
4,4'-bis-(1''-amino-8''-hydroxy-3'',6''-disulfo-7''-naphthylazo)-3,3'-dimethoxydiphenyl,
2-amino-5-hydroxy-6-[4'-(2''-sulfophenylazo)-2'-methoxy-5'-methylphenylazo]-naphthalene-1,7-disulfonic acid, 1-amino-8-hydroxy-2-(2',5'-disulfophenylazo)-7-(3'-amino-6'-sulfophenylazo) -naphthalene-3;6-disulfonic acid;

the copper complex of 1-amino-8-hydroxy-7-[4'-(2"-sulfophenylazo)-2'-hydroxy-5'-methylphenylazo-naphtalene-3,6-disulfonic acid, the copper complex of 2-amino-5-hydroxy-6-[4'-(2",5"-disulfophenylazo)-2'-hydroxy-5'-methylphenylazo]-napthalene-7-sulfonic acid, the copper complex of 1-(4'-amino-2'-sulfophenyl)-3-carboxy-4-[4"-(2''',5'''-disulfophenylazo)-2"-hydroxy-5"-methylphenylazo-5-pyrazolone, the copper complex of 2-(4'-amino-3'-sulfoanilino)-5-hydroxy-6-(2"-carboxyphenylazo)-naphthalene-7-sulfonic acid, the 2:1 chromium complex of 2-amino-6'-nitro-8,2'-dihydroxy-7,1'-azonaphthalene-6,4'-disulfonic acid, the 2:1 chromium complex of 2-amino-5-hydroxy-6-(2'-carboxyphenylazo)-naphthalene-7-sulfonic acid, the 2:1 chromium complex of 1-amino-8-hydroxy-7-(4'-nitro-2'-hydroxyphenylazo)-naphthalene-3,6-disulfonic acid, the 2:1 cobalt complex of 2-(4'-amino-3'-sulfoanilino)-5-hydroxy-6-(5"-chloro-2-(4'-amino-3'-sulfonilino)-5-sulfonic acid, the copper complex of 2-amino-6'-nitro-2',8-dihydroxy-1',7-azonaphthalene-4',6-disulfonic acid, the copper complex of 1,6'-diamino-2',8-dihydroxy-1',7-azonaphthalene-2,4,4'-trisulfonic acid, the copper complex of 6'-amino-1',2-dihydroxy-1,2'-azonaphthalene-3,4',6,8'-tetrasulfonic acid, the copper complex of 1-amino-1',8-dihydroxy-2',7-azonaphthalene-3,4',6,8'-tetrasulfonic acid.

A further method of preparing dyes according to the invention comprises preparing monoazo or disazo dyes or if desired their metal complexes of the formula V

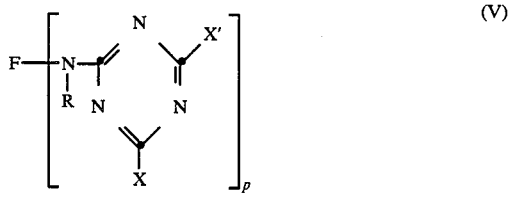

in which F is a radical of one of the abovementioned formulae VIa to VIc and X and X' are as defined above, by using diazo and coupling components of which one or if desired both contain a group of the formula Va

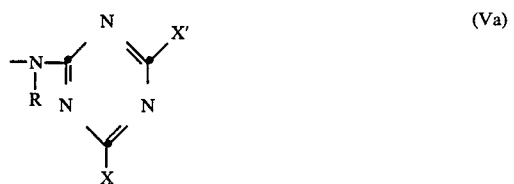

and then, as described above, reacting the product with an amine of the formula IIa or II'a.

The necessary starting materials for this preparative method are obtained by reacting diazo or coupling components which contain a radical of the formula

with acylating agents of the formula IV.

Diazo components for the direct preparation of azo dyes of the formula V in which F is a radical of the formula VIb or VIc can be obtained for example by acylating the

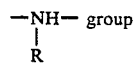

of an aromatic amine listed in list 2 with an acylating agent of the formula IV.

Coupling components for the direct preparation of azo dyes of the formula V in which F is a radical of the formula VIa or VIc can be obtained for example by acylating the

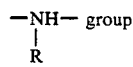

of a coupling component mentioned in list 5 with an acylating agent of the formula IV.

Examples of complexing metals which can be present in F radicals of metal-containing monoazo or disazo dyes are chromium, manganese, cobalt, nickel and copper. Preference is given to copper, chromium and cobalt.

In a further important group of dyes of the general formula III, F is the radical of a derivative of 1-aminoanthraquinone or 1-anilinoanthraquinone, in particular the radical of a 4-phenylamino-1-aminoanthraquinone-2-sulfonic acid derivative. Suitable aminoanthraquinones contain 2 to 3, preferably 2 amino groups which can also be substituted by alkyl or aryl. Alkyl radicals have in particular 1 to 4, in particularly 1 to 2 C atoms; phenyl is the preferred aryl radical. The derivatives of aminoanthraquinone can contain 1 or 2 sulfo groups directly in the anthraquinone nucleus and one or two sulfo groups in the aromatic substituents present on the anthraquinone nucleus. The group of the formula

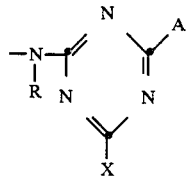

can be bonded directly to the anthraquinone nucleus, but is preferably bonded to a substituent on the anthraquinone nucleus.

In a preferred group of novel anthraquinone dyes of the formula I, F is a radical of the formula VII

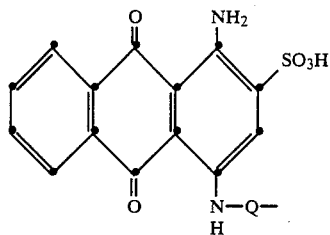

(VII)

in which the anthraquinone nucleus can be substituted by a further sulfo group. Q is a phenylene radical which carries a radical of the general formula IIIa. The phenylene radical Q can be substituted by a sulfo or carboxyl group, so that the dye contains at least two powerfully water-solubilizing groups. Furthermore, the phenylene radical can be substituted by an alkoxy group having 1–3 C atoms, by a halogen atom, or by 1 to 3 alkyl groups having 1–3 C atoms.

The preferred anthraquinone dyes of the general formula III in which F is a radical of the formula VII are prepared by condensing a diamine of the general formula

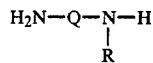

or its monoacyl derivative

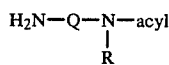

with an anthraquinone derivative which contains in the 4-position a reactive substituent, for example a Br atom. The acyl is as defined above, in particular where characterized as preferable.

Examples of suitable diamines of the formula

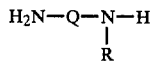

which can also be used in the form of their acyl derivatives are:
2,4-diaminobenzenesulfonic acid,
2,4-diaminotoluene-6-sulfonic acid,
2,6-diaminotoluene-4-sulfonic acid,
3,5-diamino-2,4,6-trimethylbenzenesulfonic acid,
p-phenylenediamine,
2,5-diaminobenzenecarboxylic acid,
2,5-diaminobenzenesulfonic acid,
2,4-diaminobenzenecarboxylic acid.

Examples of dyes of the formula III in which F is the radical of a 1-aminoanthraquinone are
1-amino-4-(3'-amino-4'-sulfoanilino)-anthraquinone-2-sulfonic acid,
1-amino-4-(3-amino-2',4',6'-trimethyl-4'-sulfoanilino)-anthraquinone-2-sulfonic acid,
1-amino-4-(4'-amino-3'-sulfoanilino)-anthraquinone-2,5-disulfonic acid,
1-amino-5,8-bis-(4'-methyl-2'-sulfoanilino)-anthraquinone.

In a further important group of dyes of the general formula III, F is the radical of a sulfophthalocyanine dye, in particular of a derivative of phthalocyaninesulfanilide or phthalocyaninesulfalkylamide having 2–6 C atoms in the alkyl chain which carries at least 2 sulfo groups in the phthalocyanine nucleus.

In a preferred group of phthalocyanine dyes of the general formula III, F is a radical of the formula VIII

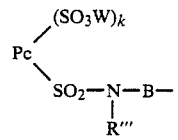

(VIII)

in which
Pc is the radical of a metal-containing or metal-free phthalocyanine nucleus, preferably of copper- or nickel-phthalocyanine,
W is —OH and/or —NR'R", where R', R" and R''', independently of one another, are each hydrogen or alkyl having 1–4 C atoms,
k is 1 to 3 and
B is a phenyl radical which can be substituted by halogen, to 3 alkyl groups having 1–2 C atoms or by one or two sulfo or carboxyl groups or is an alkyl radical having 2–6 C atoms.

Preferably B is a phenyl radical which is substituted by a sulfo group or is ethylene.

The dyes of the formula III in which F is a radical of the formula VIII are prepared in a manner known per se by condensing a sulfochloride of the formula

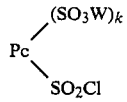

in which Pc, W and k are as defined above, with a diamine of the general formula

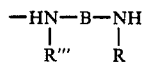

or with its monoacyl derivative

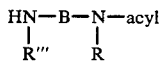

in which acyl is as defined above, in particular where characterized as preferable. Examples of diamines of the formula

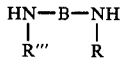

which are suitable for preparing the preferred phthalocyanine dyes of the formula III are:
m-phenylenediamine, p-phenylenediamine,
2,4-diaminobenzenesulfonic acid,
2,5-diaminobenzenesulfonic acid,
2,5-diaminobenzenecarboxylic acid,
2,5-diaminobenzene-1,4-disulfonic acid,
2,4-diaminotoluene-6-sulfonic acid,
ethylenediamine, hexamethylenediamine.

Examples of dyes of the formula III in which F is the radical of a N-substituted phthalocyaninesulfonamide are 3-[N-(3-amino-4-sulfophenyl)-sulfamyl]-copper-
    phthalocyanine-3',3'',3'''-trisulfonic acid,
bis-4,4'-[N-3'-amino-4'-sulfophenyl)-sulfamyl]-copper
    phthalocyanine- 4'',4'''-disulfonic acid,
3-[N-(4-amino-3-sulfophenyl)-sulfamyl]-nickel
    phthalocyanine-3',3'',3'''-trisulfonic acid,
3-[N-(3-aminophenyl)-sulfamyl]-3'-sulfamyl-copper
    phthalocyanine-3'',3'''-disulfonic acid,
3-(Nβ-aminoethyl-sulfamyl)-copper phthalocyanine-
    3',3'',3'''trisulfonic acid.

The novel reactive dyes of the formula I are highly suitable for dyeing and printing cellulose and cellulose containing materials. They are particularly distinguished in printing by a unnFzHformly high yield of fixation independently of the method of fixation, be it fixing by steaming or dry heat or in a one- or two-phase method. The various dyeing methods likewise produce very good results, be they exhaust dyeing or pad-batch dyeing or pad-thermofix dyeing. The resulting dyeings and prints combinFzHe high brilliance and depth of shade with very good light fastness properties, even in the wet state, and very good wet fastness properties, such as to washing at 60° and 95° C., and good end-use fastness properties, such as seawater fastness, acid and alkaline perspiration fastness, fastness to chlorinated water, peroxide fastness and fastness to gas fume fading. Furthermore, the dyes are distinguished by insensitivity to atmospheric effects.

Very good results are also obtained on application by reactive dyeing methods to polyamides, in particular wool. Particularly noteworthy here are in addition to the very good light fastness the excellent wash and perspiration fastness properties and the excellent buildup.

In the following examples the temperatures are given in ° C., and the parts and percentages are by weight.

EXAMPLE 1

31.9 parts of 1-amino-8-hydroxynaphthalene-3,6-disulfonic acid are dissolved in 800 ml of water under neutral conditions, and the solution is cooled down to 0° to 5°. 14.2 parts of 2,4,6-trifluoro-1,3,5-triazine are added dropwise at this temperature in the course of 20 minutes, during which the pH of the reaction solution is kept weakly acid to Congo red by the simultaneous addition of 2N sodium hydroxide solution. After addition of a mixture of 32 parts of

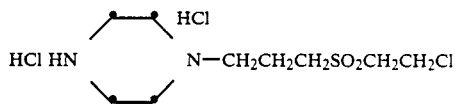

in 100 ml of water which has been adjusted to pH 5 the pH of the reaction mixture is initially briefly kept weakly acid to Congo red and then at 5–6 by the constant addition of 2N sodium hydroxide solution. At the same time the temperature is raised to 20° to 25° in the course of 2 to 3 hours. After the reaction has ended this intermediate is coupled at 0° to 10° and pH 6.5 with 30.3 parts of diazotized 2-aminonaphthalene-1,5-disulfonic acid: After the coupling reaction at pH 8 has ended the reaction mixture is clarified and the resultant reactive dye of the formula

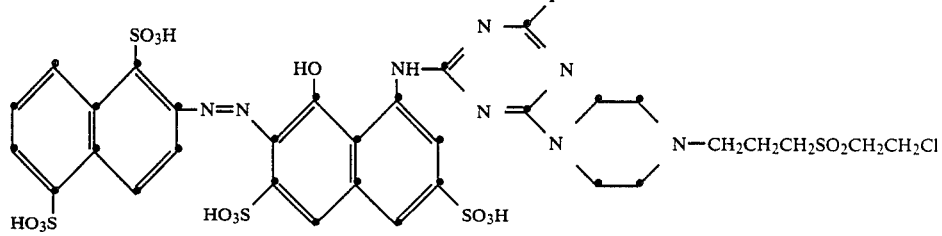

is isolated at pH 7 by freeze-drying or evaporating the reaction solution to dryness. It dyes cotton in red shades.

EXAMPLE 2

31.9 parts of 1-amino-8-hydroxynaphthalene-3,6-disulfonic acid are dissolved in 800 ml of water under neutral conditions, and the solution is cooled down to 0° to 5°. 14.2 parts of 2,4,6-trifluoro-1,3,5-triazine are added dropwise at this temperature in the course of 20 minutes, during which the pH of the reaction solution is kept weakly acid to Congo red by the simultaneous addition of 2N sodium hydroxide solution. After addition of a mixture of 31 parts of

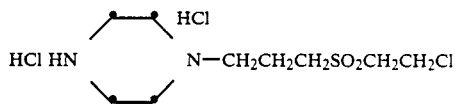

in 100 ml of water which has been adjusted to pH 5 the pH of the reaction mixture is initially briefly kept weakly acid to Congo red and then at 5–6 by the constant addition of 2N sodium hydroxide solution. At the same time the temperature is raised to 20° to 25° in the course of 2 to 3 hours. After the reaction has ended this intermediate is coupled at 0° to 10° and pH 6.5 with 30.3 parts of diazotized 2-aminonaphthalene-1,5-disulfonic acid. After the coupling reaction at pH 8 has ended the reaction mixture is clarified and the resultant reactive dye of the formula

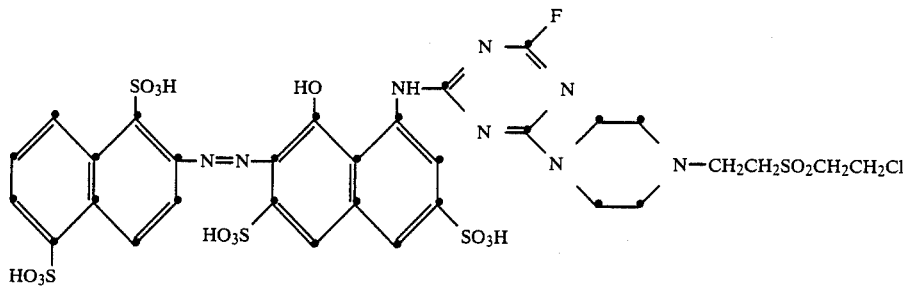

is isolated at pH 7 by freeze-drying or evaporating the reaction solution to dryness. It dyes cotton in red shades.

EXAMPLE 3

31.9 parts of 1-amino-8-hydroxynaphthalene-3,6-disulfonic acid are dissolved in 800 ml of water under neutral conditions, and the solution is cooled down to 0° to 5° 14.2 parts of 2,4,6-trifluoro-1,3,5-triazine are added dropwise at this temperature in the course of 20 minutes, during which the pH of the reaction solution is kept weakly acid to Congo red by the simultaneous addition of 2N sodium hydroxide solution. After addition of a mixture of 26 parts of HCl $H_2NCH_2CH_2OCH_2CH_2SO_2CH_2CH_2Cl$ in 100 ml of water which has been adjusted to pH 5 the pH of the reaction mixture is initially briefly kept weakly acid to Congo red and then at 5-6 by the constant addition of 2N sodium hydroxide solution. At the same time the temperature is raised to 20° to 25° in the course of 2 to 3 hours. After the reaction has ended this intermediate is coupled at 0° to 10° and pH 6.5 with 30.3 parts of diazotized 2-aminonaphthalene-1,5-disulfonic acid. After the coupling reaction at pH 8 has ended the reaction mixture is clarified and the resultant reactive dye of the formula at a temperature between 3° and 5° C. and at pH of 1.7-2.2, maintained by means of sodium bicarbonate, for a further 4 hours.

(b) A separate preparation sees the preparation of the diazonium salt of the diazo component: a solution at pH 6.7-6.8 of 224.8 parts of 4- -sulfatoethylsulfonylaniline in 640 parts of water has added to it 105 parts by volume of a 40% aqueous sodium nitrite solution. This mixture is added with thorough stirring to a mixture of 800 parts of crushed ice and 70 parts by volume of 95% aqueous sulfuric acid. Stirring continues at a temperature between 0° C. and 5° C. for a further hour and then, as customary, excess nitrous acid is destroyed with a little sulfamic acid.

(c) The primary condensation product of cyanuric chloride and aminonaphtholdisulfonic acid prepared above under (a) is combined with the diazonium salt solution described above under (b). To carry out the coupling reaction, the strongly acid reaction mixture is brought at a temperature of about 5° C. to pH 4.0-4.5 by means of sodium bicarbonate, and the temperature is raised to 15° to 20° C.. The mixture is stirred at this pH and at this temperature for a further few hours until the coupling has ended.

(d) The monoazo compound solution of (c) is combined with a solution at pH 5.5-6.0 of 240 parts of HCl

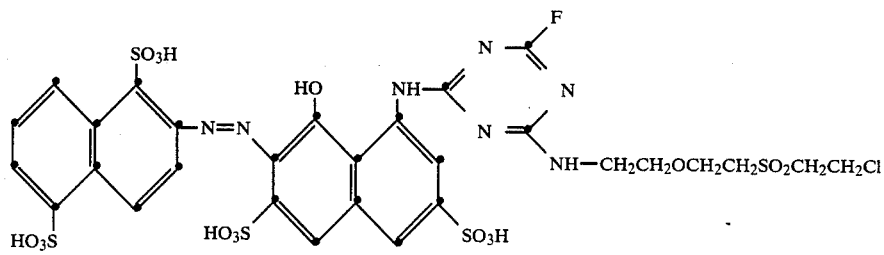

is isolated at pH 7 by freeze-drying or evaporating the reaction solution to dryness. It dyes cotton in red shades.

EXAMPLE 4

(a) 155.2 parts of cyanuric chloride are added with thorough stirring to a suspension of 255.2 parts of 1-amino-8-naphthol-4,6-disulfonic acid in 1,440 parts of water and 720 parts of ice; the reaction batch is stirred $H_2NCH_2CH_2OCH_2CH_2SO_2CH_2CH_2Cl$ in 640 parts of water. The pH is maintained at about 6 and the reaction mixture is raised to a temperature of 60° to 65° C. in the course of two hours. The pH is then raised to between 6.5 and 7.0 withسodium bicarbonate, and the filtrate is spray-dried.

About 1,100 parts of a powder which contains sodium chloride and has the formula

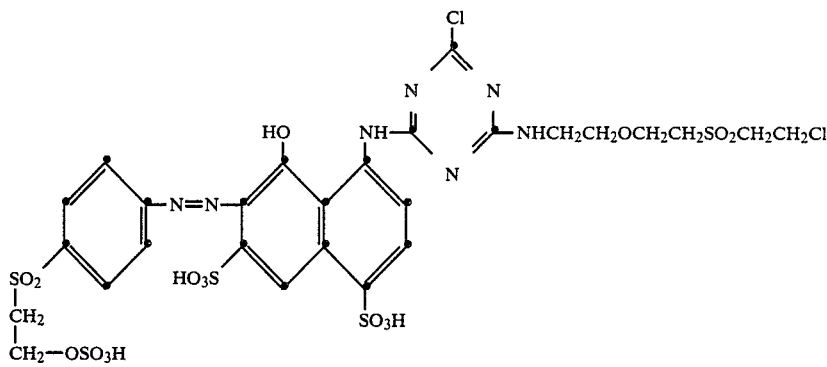

are obtained. It dyes cotton in red shades.

EXAMPLE 5

(a) 15 5.2 parts of cyanuric chloride are added with thorough stirring to a suspension of 255.2 parts of 1-amino-8-naphthol-3,6-disulfonic acid in 1,440 parts of water 720 parts of ice; the reaction batch is stirred at a temperature between 3° and 5° C. and at pH of 1.7-2.2, maintained by means of sodium bicarbonate, for a further 4 hours.

(b) A separate preparation sees the preparation of the diazonium salt of the diazo component: a solution at pH 6.7-6.8 of 224.8 parts of 4-β-sulfatoethylsulfonylaniline in 640 parts of water has added to it 105 parts by volume of a 40% aqueous sodium nitrite solution. This mixture is added with thorough stirring to a mixture of 800 parts of crushed ice and 70 parts by volume of 95% aqueous sulfuric acid. Stirring continues at a temperature between 0° C. and 5° C. for a further hour and then, as customary, excess nitrous acid is destroyed with a little sulfamic acid.

(c) The primary condensation product of cyanuric chloride and aminonaphtholdisulfonic acid prepared above under (a) is combined with the diazonium salt solution described above under (b). To carry out the coupling reaction, the strongly acid reaction mixture is brought at a temperature of about 5° C. to pH 4.0-4.5 by means of sodium bicarbonate, and the temperature is raised to 15° to 20° C. The mixture is stirred at this pH and at this temperature for a further few hours until the coupling has ended.

(d) The monoazo compound solution of (c) is combined with a solution at pH 5.5-6.0 of 240 parts of HCl H₂NCH₂CH₂OCH₂CH₂SO₂CH₂CH₂Cl in 640 parts of water. The pH is maintained at about 6 and the reaction mixture is raised to a temperature of 60° to 65° C. in the course of two hours. The pH is then raised to between 6.5 and 7.0 with sodium bicarbonate, and the filtrate is spray-dried.

About 1,100 parts of a powder which contains sodium chloride and has the formula

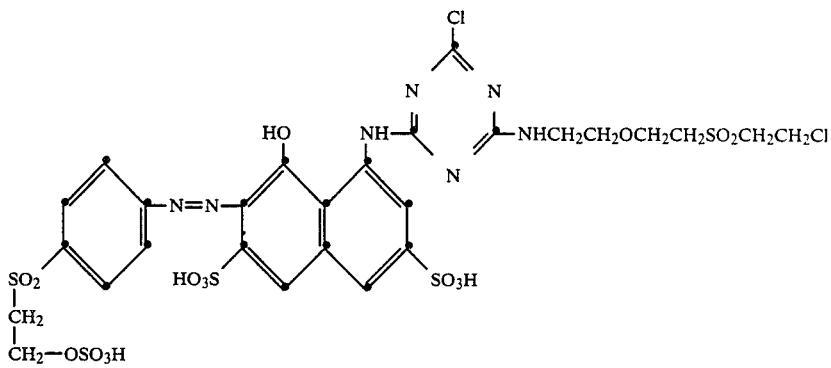

are obtained. It dyes cotton in red shades.

EXAMPLE 6

(a) 155.2 parts of cyanuric chloride are added with thorough stirring to a suspension of 255.2 parts of 1-amino-naphthol-4,6-disulfonic acid in 1,440 parts of water and 25 720 parts of ice; the reaction batch is stirred at a temperature between 3° and 5° C. and at pH of 1.7-2.2;-maintained by means of sodium bicarbonate, for a further 4 hours.

(b) A separate preparation sees the preparation of the diazonium salt of the diazo component: a solution at pH 6.7-6.8 of 224.8 parts of 4-β-sulfatoethylsulfonylaniline in 640 parts of water has added to it 105 parts by volume of a 40% aqueous sodium nitrite solution. This mixture is added with thorough stirring to a mixture of 800 parts of crushed ice and 70 parts by volume of 95% aqueous sulfuric acid. Stirring continues at a temperature between 0° C. and 5° C. for a further hour and then, as customary, excess nitrous acid is destroyed with a little sulfamic acid.

(c) The primary condensation product of cyanuric chloride and aminonaphtholdisulfonic acid prepared above under (a) is combined with the diazonium salt solution described above under (b). To carry out the coupling reaction, the strongly acid reaction mixture is brought at a temperature of about 5° C. to pH 4.0-4.5 by means of sodium bicarbonate, and the temperature is raised to 15° to 20° C. The mixture is stirred at this pH and at this temperature for a further few hours until the coupling has ended.

(d) The monoazo compound solution of (c) is combined with a solution at pH 5.5–6.0 of 300 parts of

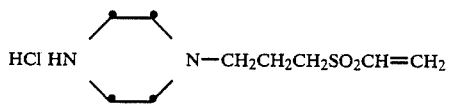

in 640 parts of water. The pH is maintained at about 6 and the reaction mixture is raised to a temperature of 60° to 65° C. in the course of two hours. The pH is then raised to between 6.5 and 7.0 with sodium bicarbonate, and the filtrate is spray-dried.

About 1,200 parts of a powder which contains sodium chloride and has the formula

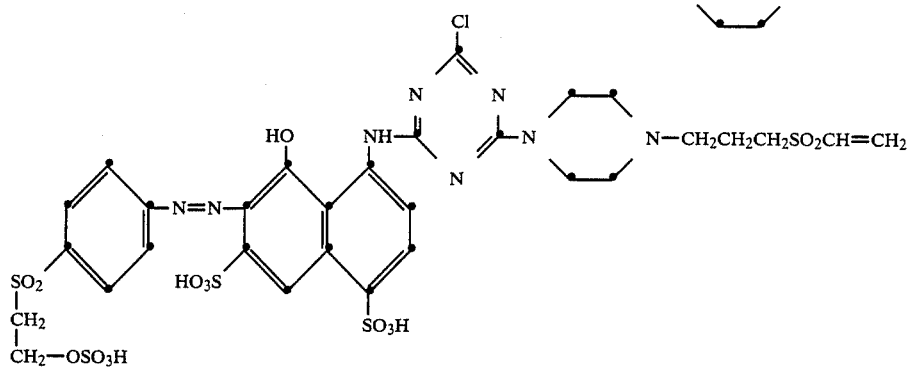

are obtained. It dyes cotton in red shades.

EXAMPLE 7

(a) 155.2 parts of cyanuric chloride are added with thorough stirring to a suspension of 255.2 parts of 1-amino-8-naphthol-4,6-disulfonic acid in 1,440 parts of water 720 parts of ice; the reaction batch is stirred at a temperature between 3° and 5° C. and at pH of 1.7–2.2, main by means of sodium bicarbonate, for a further 4 hours.

(b) A separate preparation sees the preparation of the diazonium salt of the diazo component: a solution at pH 6.7–6.8 of 142.8 parts of 4-vinylsulfonylaniline in 600 parts of water has added to it 105 parts by volume of a 40% aqueous sodium nitrite solution. This mixture is added with thorough stirring to a mixture of 800 parts of crushed ice and 70 parts by volume of 95% aqueous sulfuric acid. Stirring continues at a temperature between 0° C. and 5° C. for a further hour and then, as customary, excess nitrous acid is destroyed with a little sulfamic acid.

(c) The primary condensation product of cyanuric chloride and aminonaphtholdisulfonic acid prepared above under a) is combined with the diazonium salt solution described above under (b). To carry out the coupling reaction, the strongly acid reaction mixture is brought at a temperature of about 5° C. to pH 4.0–4.5 by means of sodium bicarbonate, and the temperature is raised to 15° to 20° C.. The mixture is stirred at this pH and at this temperature for a further few hours until the coupling has ended.

(d) The monoazo compound solution of (c) is combined with a solution at pH 5.5–6.0 of 290 parts of

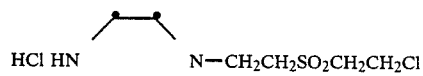

in 640 parts of water. The pH is maintained at about 6 and the reaction mixture is raised to a temperature of 60° to 65° C. in the course of two hours. The pH is then raised to between 6.5 and 7.0 with sodium bicarbonate, and the filtrate is spray-dried.

About 1,000 parts of a powder which contains sodium chloride and has the formula

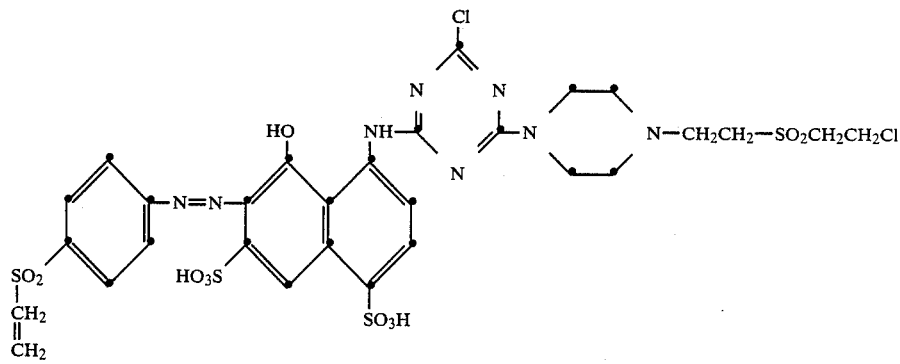

are obtained. It dyes cotton in red shades.

EXAMPLE 8

18.5 parts of cyanuric chloride are dissolved in 110 parts of acetone, and the solution is poured with vigorous stirring onto 250 parts of ice. To this is added at 0° a solution of 55.3 parts of the dye of the following structure

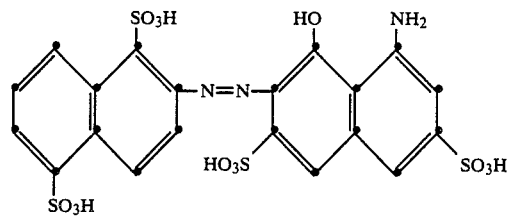

50 parts of 2N sodium carbonate solution are then added dropwise, the result being a pH of 6–6.5. 22 parts of HCl H$_2$NCH$_2$CH$_2$—O—CH$_2$CH$_2$SO$_2$CH=CH$_2$ are then added in the form of a powder. The mixture is raised to 40° C. in the course of ½ hour and is maintained there for 3 hours. 100 parts of 2N sodium carbonate solution are simultaneously added dropwise at pH 6.0–6.5. To precipitate the dye, 20% potassium chloride are added, the mixture is allowed to cool down with stirring to 20°–25°, and the precipitate is filtered off. The result is about 235 parts of dye paste which are dried at 50°–55° in vacuo. The synthesized reactive dye has the following structure

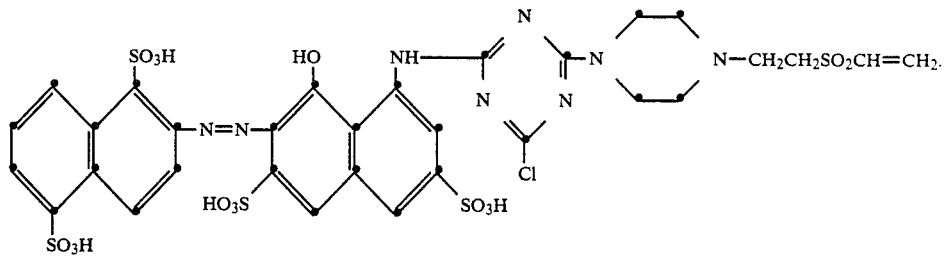

EXAMPLE 9

18.5 parts of cyanuric chloride are dissolved in 110 parts of acetone, and the solution is poured with vigorous stirring onto 250 parts of ice. To this is added at 0° a solution of 55.3 parts of the dye of the following structure

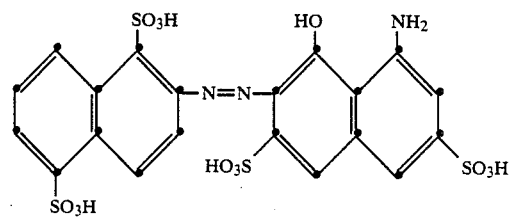

50 parts of 2N sodium carbonate solution are then added dropwise, the result being a pH of 6–6.5. 26 parts of

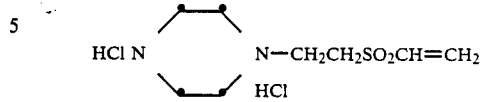

are then added in the form of a powder. The mixture is raised to 40° in the course of ½ hour and is maintained there for 3 hours. 100 parts of 2N sodium carbonate solution are simultaneously added dropwise at pH 4.0–6.0. To precipitate the dye, 20% potassium chloride is added, the mixture is allowed to cool down with stirring to 20°–25°, and the precipitate is filtered off. The result is about 235 parts of dye paste which are dried at 50°–55° in vacuo. The synthesized reactive dye has the following structure

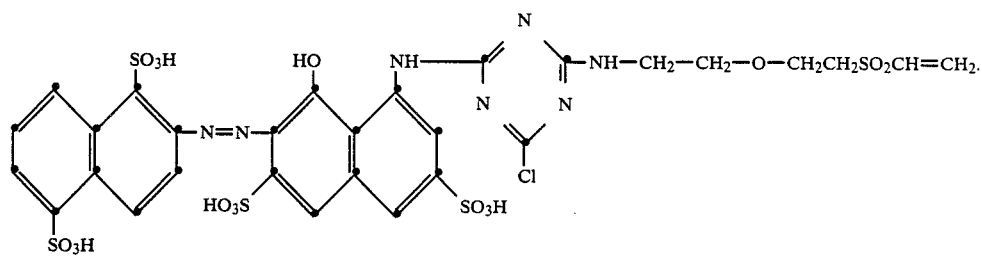

EXAMPLE 10

18.5 parts of cyanuric chloride are dissolved in 110 parts of acetone, and the solution is poured with vigorous stirring onto 250 parts of ice. To this is added at 0° a solution of 55.3 parts of the dye of the following structure

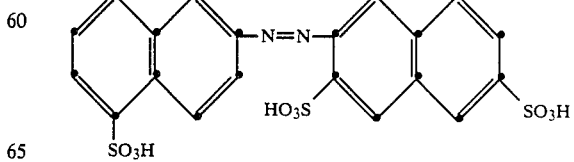

50 parts of 2N sodium carbonate solution are then added dropwise, the result being a pH of 6–6.5. 26.5 parts of

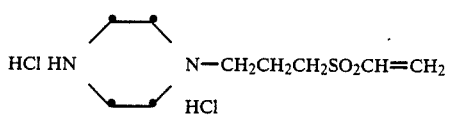

are then added in the form of a powder. The mixture is raised to 40° in the course of ½ hour and is maintained there for 3 hours. 100 parts of 2N sodium carbonate solution are simultaneously added dropwise at pH 4.0–6.0. To precipitate the dye, 20% potassium chloride is added, the mixture is allowed to cool down with stirring to 20°–25°, and the precipitate is filtered off. The result is about 235 parts of dye paste which are dried at 50°–55° in vacuo. The synthesized reactive dye has the following structure

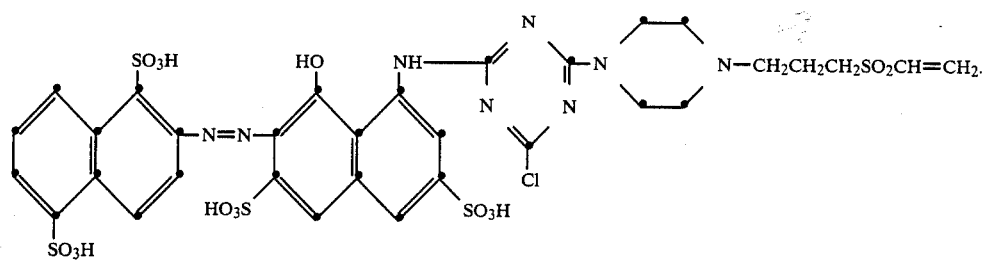

Similarly useful reactive dyes can also be obtained by repeating the above examples on the azo dyes obtainable from the diazo and coupling components given in the following table in place of using the above starting dye 1-amino-8-hydroxy-2',7-azonaphthalene-1',3,5',6-tetrasulfonic acid.

Diazo components

2-Aminobenzenesulfonic acid, 3-aminobenzenesulfonic acid, 4-aminobenzenesulfonic acid, 5-chloro-2-aminobenzenesulfonic acid, 4-aminobenzenesulfonic acid, 6-chloro-2-aminobenzenesulfonic acid, benzenesulfonic acid, 4-chloro-3-aminobenzenesulfonic acid, 6-chloro-3-aminobenzenesulfonic acid, 3-chloro-4-aminobenzenesulfonic acid, 2-aminotoluene-4-sulfonic acid, toluene-5-sulfonic acid, 3-aminotoluene-6-sulfonic acid, 4-aminotoluene-2-sulfonic acid, 4-aminotoluene-3-sulfonic acid, 5-chloro-2-aminotoluene-3-sulfonic acid, 3-chloro-2-aminotoluene-5-sulfonic acid, 6-chloro-3-aminotoluene-4-sulfonic acid, 2-chloro-4-aminotoluene-5-sulfonic acid, 2-chloro-4-aminotoluene-6-sulfonic acid, 4-nitro-2-chloro-4-aminotoluene-6-sulfonic acid, 4-nitro-2-aminotoluene-6-sulfoninic acid, 6-amino-1,2-dimethylbenzene-4-sulfonic acid, 4-amino-1,3-dimethylbenzene-5-sulfonic acid, 4-amino-1,3-dimethylbenzene-6-sulfonic acid, 2-aminoanisole-4-sulfonic acid, 2-sulfonic acid, 4-aminoanisole-3-sulfonic acid, 4-chloro-2-aminoanisole-5-sulfonic acid, 4-aminophenetole-2-sulfonic acid, 4-aminophenetole-3-sulfonic acid, 2-aminophenetole-4sulfonic acid, 4-aminobenzene-1,3-disulfonic acid, 2-amino benzene-1,4-disulfonic acid, 2-aminotoluene-3,4-disulfonic acid, 2-aminotoluene-3,5-disulfonic acid, aniline, 4-aminotoluene, 4-aminoanisole, 4-aminochlorobenzene, 2-aminobenzene-sulfonic acid, 2-naphthylamine-1-sulfonic acid, 2-naphthylamino- 5-sulfonic acid, 2-naphthylamine-6-sulfonic acid, 2-naphthylamine-7-sulfonic acid, 2-naphthylamine-8-sulfonic acid, 2-naphthylamine-1,7-disulfonic acid, 2-naphthylamine-3,6-disulfonic acid, 2-naphthylamine-3,7-disulfonic acid, 2-naphthylamine-4,7-disulfonic acid, 2-naphthylamine-4,8-di-sulfonic acid, 2-naphthylamine-5,7-disulfonic acid, 2-naphthylamine-6,8-disulfonic acid, 2-naphthylamine-1,5,7-trisulfonic acid 2-naphthylamine-3,6,8-trisulfonic acid, 2-naphthylamine-4,6,8-trisulfonic acid, 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-3,6-disulfonic acid, 1-naphthylamine-3,7-disulfonic acid, 1-naphthylamine-3,8-disulfonic acid, 1-naphthylamine-amine-4,6-disulfonic acid, 1-naphthylamine-4,7-disulfonic acid, 1-naphthylamine-4,8-disulfonic acid, 1-naphthylamine-5,7-disulfonic acid, 1-naphthylamine-6,8-disulfonic acid, 1-naphthylamine-2,4,6-trisulfonic acid, 1-naphthylamine-3,6,8-trisulfonic acid, 1-naphthylamine-4,6,8-trisulfonic acid, 1-amino-4-β-chloroethylsulfonylbenzene, 1-amino-3-vinylsulfonylbenzene, 1-amino-2-bromo-4-β-sulfatoethylsulfonylbenzene, 1-amino-4-β-sulfatoethylsulfonylbenzene-2-sulfonic acid, 1-amino-3-δ-(β-chloroethylsulfonyl)-butyrylbenzene-6-sulfonic acid, 2-amino-8-β-sulfatoethylsulfonylnaphthalene, 2-amino-6-β-sulfatoethylsulfonylnaphthalene-1-sulfonic acid, 2-amino-8-vinylsulfonylnaphthalene-6-sulfonic acid.

Coupling components

1-Amino-8-naphthol-4,6-disulfonic acid, 1-amino-8-naphthol-4-sulfonic acid, 1-amino-8-napthol-6-sulfonic acid, 1-amino-8-naphthol-3,5-disulfonic acid, 1-(4'-aminobenzoylamino)-8-naphthol-3,6- or -4,6-disulfonic acid, 1-(3'-aminobenzoylamino)-8-naphthol-3,6- or -4,6-disulfonic acid.

EXAMPLE 11

50.3 parts of the dye 2-amino-5-hydroxy-6-(2,5-disulfonylbenzeneazo)-naphthalene-7-sulfonic acid are dissolved in 800 ml of water under neutral conditions, and the solution is cooled at 0° to 5° C. At this temperature 14.2 parts of 2,4,6-trifluoro-1,3,5-triazine are added dropwise in the course of 20 minutes, during which the pH of the reaction solution is simultaneously kept at 6–6.5 by adding 2N sodium hydroxide solution. After addition of 21 parts of

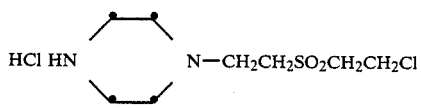

in 100 ml of water the temperature is raised to 20° to 25° C. and the pH is maintained at 5.5–6.5. Duration of reaction: about 2 hours.

To precipitate the dye, 10% sodium chloride and 10% potassium chloride are added to the neutral solution, which is then filtered. The resulting paste is dried at 40° to 50° in vacuo. The reactive dye thus synthesized has the following structure:

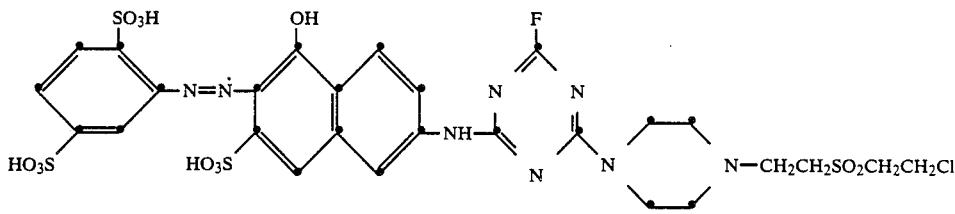

EXAMPLE 12

50.3 parts of the dye 2-amino-5-hydroxy-6-(2,5-disulfonylbenzeneazo)-naphthalene-7-sulfonic acid are dissolved in 800 ml of water under neutral conditions, and the solution is cooled at 0° to 5° C. At this temperature 14.2 parts of 2,4,6-trifluoro-1,3,5-triazine are added dropwise in the course of 20 minutes, during which the pH of the reaction solution is simultaneously kept at 6–6.5 by adding 2N sodium hydroxide solution. After addition of 32 parts of

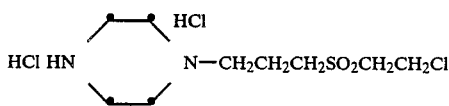

in 100 ml of water the temperature is raised to 20° to 25° C. and the pH is maintained at 5.5–6.5. Duration of reaction: about 2 hours.

To precipitate the dye, 10% sodium chloride and 10% potassium chloride are added to the neutral solution, which is then filtered. The resulting paste is dried at 40° to 50° in vacuo. The reactive dye thus synthesized has the following structure:

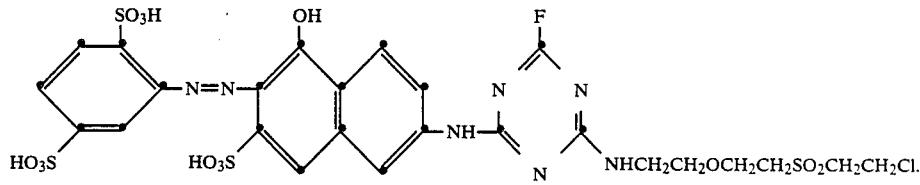

$2SO_2CH_2CH_2Cl$ in 100 ml of water the temperature is raised to 20° to 25° C. and the pH is maintained at 5-5-6.5. Duration of reaction: about 2 hours.

To precipitate the dye, 10% sodium chloride and 10% potassium chloride are added to the neutral solution, which is then filtered. The resulting paste is dried at 40° to 50° in vacuo. The reactive dye thus synthesized has the following structure:

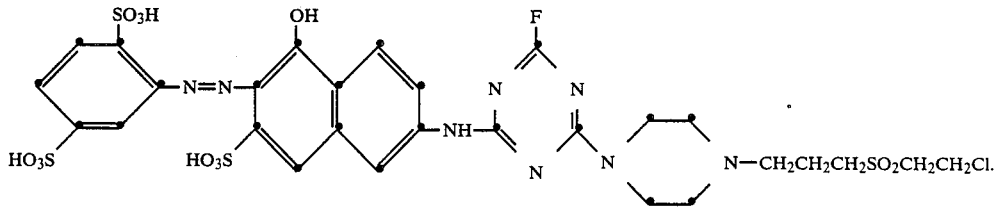

The starting dye 2-amino-5-hydroxy-6-(2′, 5′-disulfophenylazo)-naphthalene-7-sulfonic acid which is required for preparing the dye according to the invention can be obtained as follows:

50.6 parts of 2-aminobenzene-1,4-disulfonic acid are dissolved in 120 parts of water under neutral conditions, and the solution is diazotized in the conventional manner. Thereupon the diazo compound is added at 0°–5° to a mixture of 56.2 parts of 2-acetamino-5-naphthol-7-sulfonic acid, dissolved in 300 parts of water under neutral conditions, 25 parts of sodium hydrogencarbonate and 150 parts of ice. The pH is initially 6.5 and rises on prolonged stirring to 7.5-7.8. After the coupling has ended, 60 parts of 10N sodium hydroxide solution are added, and the mixture is heated at 90° for 2 hours to hydrolyze the acetamino group. The alkaline solution of the orange intermediate dye is neutralized with about 22 parts of 10N hydrochloric acid, 20% sodium chloride and 15% potassium chloride are added, and the mixture is stirred for some time and is filtered.

EXAMPLE 13

50.3 parts of the dye 2-amino-5-hydroxy-6-(2,5-disulfonylbenzeneazo)-naphthalene-7-sulfonic acid are dissolved in 800 ml of water under neutral conditions, and the solution is cooled at 0° to 5° C. At this temperature 14.2 parts of 2,4,6-trifluoro-1,3,5-triazine are added dropwise in the course of 20 minutes, during which the pH of the reaction solution is simultaneously kept at 6–6.5 by adding 2N sodium hydroxide solution. After addition of 26 parts of HCl $H_2NCH_2CH_2OCH_2CH-$ Example 13 is repeated, except that 2-aminobenzene-1,4-disulfonic acid is replaced by a molar amount of one of the diazo components named hereinafter, likewise affording useful dyes according to the invention: 2-aminobenzenesulfonic acid, 3-aminobenzenesulfonic acid, 4-aminobenzenesulfonic acid, 2-naphthylamine-1,5-disulfonic acid, 5-chloro-2-aminobenzenesulfonic acid, 6-chloro-2-aminobenzenesulfonic acid, 5-nitro-2-aminobenzenesulfonic acid, 4-chloro-3-aminobenzenesulfonic acid, 6-chloro-3-aminobenzenesulfonic acid, 3-chloro-4-aminobenzenesulfonic acid, 2-aminotoluene-4-sulfonic acid, 2-aminotoluene-5-sulfonic acid, 3-aminotoluene-6-sulfonic acid, 4-aminotoluene-2-sulfonic acid, 4-aminotoluene-3-sulfonic acid, 5-chloro-2-aminotoluene-3-sulfonic acid, 3-chloro-2-aminotoluene-5-sulfonic acid, 6-chloro-3-aminotoluene-4-sulfonic acid, 2-chloro-4-aminotoluene-5-sulfonic acid, 2-chloro-4-aminotoluene-6-sulfonic acid, 4-nitro-2-aminotoluene-6-sulfonic acid, 6-nitro-4-aminotoluene-2-sulfonic acid, 3-amino-1,2-dimethylbenzene-4-sulfonic acid, 4-amino-1,3-dimethylbenzene-5-sulfonic acid, 4-amino-1,3-dimethylbenzene-6-sulfonic acid, 2-aminoanisole-4-sulfonic acid, 4-aminoanisole-2-sulfonic acid, 4-aminoanisole-3-sulfonic acid, 4-chloro-2-aminoanisole-5-sulfonic acid, 4-aminophenetole-2-sulfonic acid, 4-aminophenetole-3-sulfonic acid, 2-aminophenetole-4-sulfonic acid, 4-aminobenzene-1,3-disulfonic acid, 2-aminotoluene-3,4-disulfonic acid, 2-aminotoluene-3,5-disulfonic acid, aniline, 4-aminotoluene, 4-aminoanisole, 4-amino-chlorobenzene, 2-aminochlorobenzene, 2-naphthylamine-1-sulfonic acid, 2-naphthylamine-5-sulfonic acid, 2-naphthylamine-6-sulfonic acid, 2-naphthylamine-7-sulfonic acid, 2-naphthylamine-8-sulfonic acid, 2-naphthylamine-1,7-disulfonic acid, 2-naphthylamine-3,6-disulfonic acid, 2-naphthylamine-3,7-disulfonic acid, 2-naphthylamine-4,7-disulfonic acid, 2-naphthylamine-5,7-disulfonic acid, 2-naphthylamine-6,8-disulfonic acid, 2-naphthylamine-1,5,7-trisulfonic acid, 2-naphthylamine-3,6,8-trisulfonic acid, 2-naphthylamine-4,6,8-trisulfonic acid.

Example 13 is repeated, except that 2-acetamino-5-naphthol-7-sulfonic acid, used as coupling component for preparing the starting dye, is replaced by molar amounts of the acetyl compound of one of the coupling components named hereinafter, likewise affording useful dyes according to the invention:

2-amino-8-naphthol-6-sulfonic acid, 2-methylamino-8-naphthol-6-sulfonic acid, 2-carboxymethylamino-8-naphthol-6-sulfonic acid, 2β-sulfoethylamino-8-naphthol-6-sulfonic acid, 2-isopropylamino-8-naphthol-6-sulfonic acid, 2-methylamino-5-naphthol-7-sulfonic acid, 2-ethylamino-5-naphthol-7-sulfonic acid, 2-n-butylamino-5-naphthol-7-sulfonic acid, 2-amino-8-naphthol-4-sulfonic acid, 2-amino-5-naphthol-4,7-disulfonic acid, 1-amino-5-naphthol-7-sulfonic acid, 2-amino-5-naphthol-1,7-disulfonic acid.

EXAMPLE 14

Example 13 is repeated, except that the 26 parts of HCl H$_2$NCH$_2$CH$_2$OCH$_2$CH$_2$SO$_2$CH$_2$CH$_2$Cl are replaced by a molar amount of the hydrochloride of one of the amines mentioned hereinafter, likewise affording useful dyes according to the invention:

α-carboxy-β-(β'-chloroethylsulfonyl)-ethylamine hydrochloride, α-ethoxycarbonyl-β-(β'-chloroethylsulfonyl)-ethylamine hydrochloride, β-hydroxy-γ-(β'-chloroethylsulfonyl)-propylamine hydrochloride.

EXAMPLE 15

Replacing the 14.2 parts of cyanuric fluoride in Examples 11 to 14 by the molar amount of one of the derivatives of 1,3,5-triazine which are mentioned hereinafter likewise affords useful dyes according to the invention: tribromotriazine, trichlorotriazine, trisulfotriazine, tris-methylsulfonyltriazine, tris-ethylsulfonyltriazine, tris-phenylsulfonyltriazine, dichlorofluorotriazine, chloro-disulfotriazine, chloro-bis-methylsulfotriazine.

EXAMPLE 16

76.6 parts of 2-naphthylamine-3,6,8-trisulfonic acid are dissolved in 250 parts of water under neutral conditions. To this solution are added 50 parts of 4N sodium nitrite solution. This mixture is added to a mixture of 50 parts of 10N hydrochloric acid and 400 parts of ice. To this suspension of the diazo compound is added at 0°-5° a solution of 30.2 parts of 3-aminophenylurea in 100 parts of water and 20 parts of 10N hydrochloric acid. The acidity of the mixture is initially brought back to pH 3.5 with 150 parts of 4N sodium acetate solution and then back to pH 5.5 with sodium hydroxide solution. After the coupling has ended the mixture is filtered.

54.5 parts of the dye thus prepared, namely 2-(4'-amino-2'-ureidophenylazo)-naphthalene-3,6,8-trisulfonic acid, are dissolved in 250 parts of water under neutral conditions. This neutral solution is cooled down to 0° C. At this temperature 14.2 parts of 2,4,6-trifluoro-1,3,5-triazine are added dropwise in the course of 20 minutes, during which the pH of the reaction solution is simultaneously maintained at 6–6.5 by adding 2N sodium hydroxide solution. After addition of 26 parts of HCl H$_2$NCH$_2$CH$_2$OCH$_2$CH$_2$SO$_2$CH$_2$CH$_2$Cl in 100 ml of water the temperature is raised to 20° to 25° C. and the pH is maintained at 5.5–6.5.

Duration of reaction: about 3 hours.

The resulting dye of the formula:

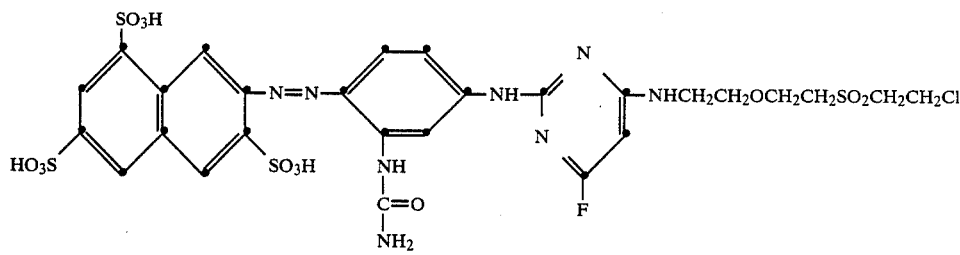

is precipitated by adding sodium chloride and is dried at 40° to 50° in vacuo.

EXAMPLE 17

54.5 parts of the dye 2-(4'-amino-2'-ureidophenylazo)-naphthalene-3,6,8-trisulfonic acid are dissolved in 250 parts of water under neutral conditions. This neutral solution is added to a suspension of cyanuric chloride in acetone and water as prepared in Example 5. The temperature is maintained at 0° to 3° by cooling with ice. 9 g of bicarbonate are added in the course of the acylation reaction in such a way that the pH remains between 5.5 and 7. When starting dye is no longer detectable by chromatography, 26 parts of HCl H$_2$NCH$_2$CH$_2$OCH$_2$CH$_2$SO$_2$CH$_2$CH$_2$Cl are added in the form of an approximately 50% strength paste, and the mixture is heated to 50°. The pH is maintained between 4.5 and 6.0 by addition of a further 18 g of bicarbonate. The reaction is complete when no further alkali is consumed. The resulting dye of the formula:

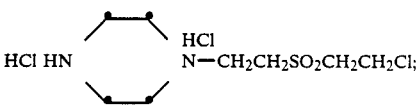

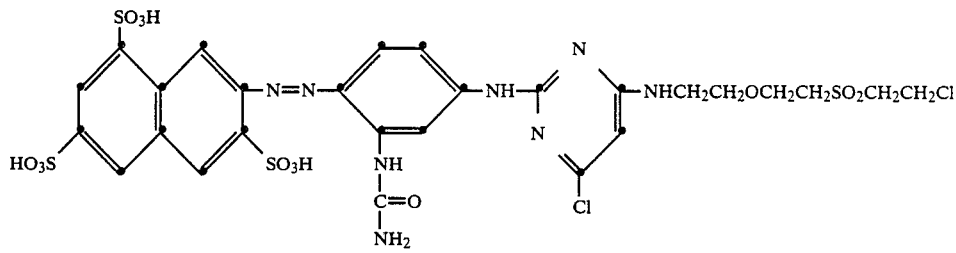

is precipitated by adding sodium chloride and is dried at 50° to 75° in vacuo.

Similarly useful reactive dyes can also be obtained by repeating Example 17 on the azo dyes obtainable from the diazo coupling components given in the table below instead of on the abovementioned starting dye 2-(4'-amino-2'-ureidophenylazo) -naphthalene-3,6,8-trisulfonic acid: Diazo components:

2-Naphthylamine-1,5-disulfonic acid, 2-naphthylamine-4,8-disulfonic acid, 2-naphthylamine-5,7-disulfonic acid, 2-naphthylamine-6,8-disulfonic acid, 2-naphthylamine-1,5,7-trisulfonic acid, 2-naphthylamine-4,6,8-trisulfonic acid, aniline-2,5-disulfonic acid.

Coupling components:

Aniline, N-methylaniline, 3-aminoanisole, 3-aminotoluene, 2-amino-4-acetaminotoluene, 2-amino-4-acetaminoanisole, 3-aminoacetanilide, 3-amino-4-methoxytoluene, 3-toluidine, 1-naphthylamine-5-sulfonic acid, 1-naphthylamine-7-sulfonic acid, 1-naphthylamine-8-sulfonic acid, 2-aminotoluene, 2-aminoanisole, 2,5-dimethylaniline, 2-methoxy-5-methylaniline, 2,5-dimethoxyaniline, o-phenetidine, m-phenetidine.

EXAMPLE 18

Replacing in Examples 16 and 17 the 26 parts of HCl H$_2$N(CH$_2$)$_2$O(CH$_2$)$_2$SO$_2$(CH$_2$)$_2$Cl by a molar amount of the hydrochloride of one of the amines mentioned below likewise affords useful dyes according to the invention: α-carboxy-β-(β'-chloroethylsulfonyl)-ethylamine hydrochloride, α-ethoxycarbonyl-β-(β'-chloroethylsulfonyl)-ethylamine hydrochloride, β-hydroxy-γ-(β'-chloroethylsulfonyl)-propylamine hydrochloride,

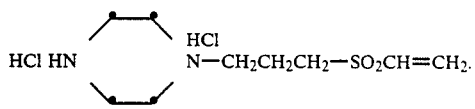

EXAMPLE 19

Replacing the 18.5 parts of cyanuric chloride or 14.2 parts of cyanuric fluoride in Examples 16 to 18 by a molar amount of one of the 1,3,5-triazine derivatives mentioned hereinafter likewise affords useful dyes according to the invention: tribromotriazine, trisulfotriazine, trismethylsulfonyltriazine, tris-ethylsulfonyltriazine, trisphenylsulfonyltriazine, dichlorofluorotriazine, chloro-disulfotriazine, chloro-bis-methylsulfonyltriazine.

EXAMPLE 20

72.5 parts of 1-[2'-sulfo-4'-(4",6"-dichloro-1",3",5"-triazin-2"-yl-amino)-phenyl]-4-(4'''-β-sulfatoethylsulfonyl-phenylazo)-5-pyrazolone-3-carboxylic acid are dissolved at pH 6.8–7.2 in water. To this solution are added at about 25° 26 parts of HCl H$_2$NCH$_2$CH$_2$OCH$_2$CH$_2$SO$_2$CH$_2$CH$_2$Cl and the mixture is heated to 35°–40°. The pH starts to decrease. When it has reached a value of about 3.5, it is maintained within the range from 3.5 to 4.5 by the addition of about 11 g of sodium carbonate a little at a time. The reaction is complete after about 3 hours, as is evident from the fact that no further alkali is consumed. The dye solution is then adjusted to 7.0 by adding disodium hydrogenphosphate. The resulting dye of the structure

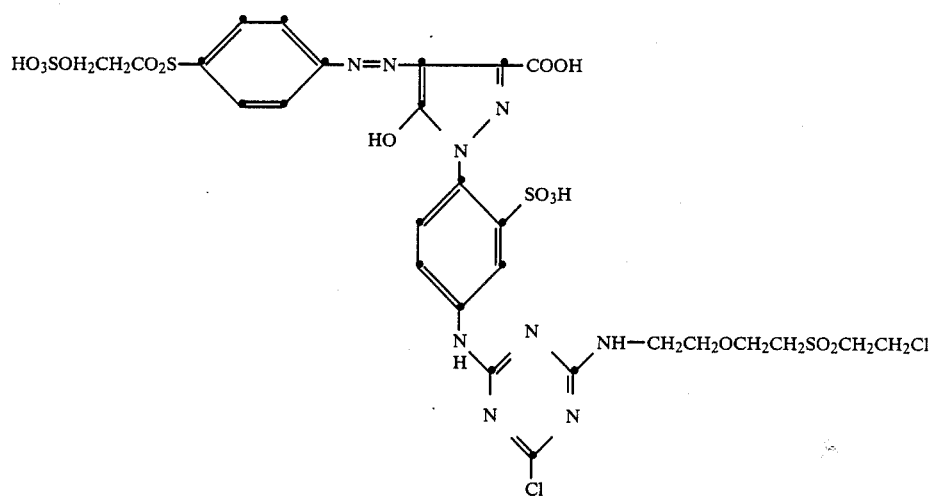

can be isolated by salting out or spray-drying.

EXAMPLE 21

63.1 parts of 1-[2'-sulfo-4'-(4", 6"-dichloro-1",3",5"-triazin-2"-yl-amino)-phenyl]-4-(2'''-sulfophenylazo) pyrazolone-5-carboxylic acid are dissolved at pH 6.8–7.2 in water. To this solution are added at about 25° 26 parts of HCl H$_2$NCH$_2$CH$_2$OCH$_2$CH$_2$SO$_2$CH$_2$CH$_2$Cl and the mixture is heated to 35°–40°. The pH starts to decrease. When it has reached a value of about 3.5, it is maintained within the range from 3.5 to 4.5 by the addition of about 11 g of sodium carbonate a little at a time. The reaction is complete after about 3 hours, as is evident from the fact that no further alkali is consumed. The dye solution is then adjusted to 7.0 by adding disodium hydrogenphosphate. The resulting dye of the structure

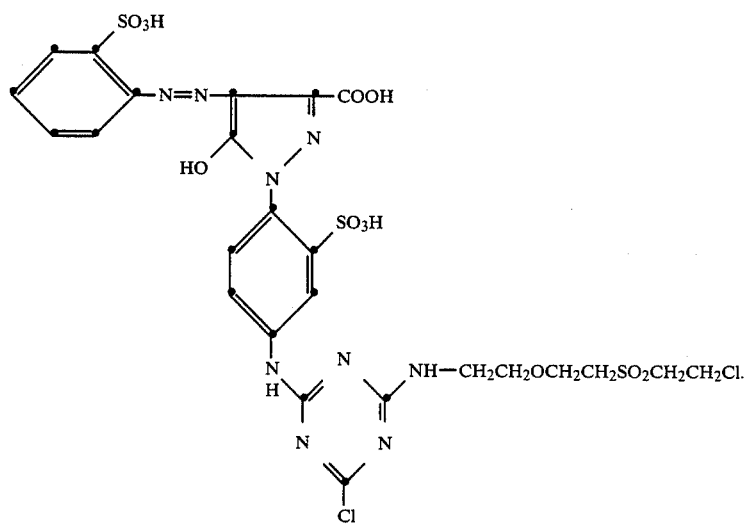

can be isolated by salting out or spray-drying.

EXAMPLE 22

Replacing the 26 parts of HCl H$_2$NCH$_2$CH$_2$—O—CH$_2$CH$_2$SO$_2$CH$_2$CH$_2$Cl in Examples 20 an 21 by a molar amount of the hydrochloride of one of the amines mentioned hereinafter likewise affords useful dyes according to the invention: α-carboxy-β-(β'-chloromethylsulfonyl) -ethylamine hydrochloride, α-ethoxycarbonyl-β-(β'-chloroethylsulfonyl) -ethylamine hydrochloride, β-hydroxy-γ-(γ'-chloroethylsulfonyl)-propylamine hydrochloride,

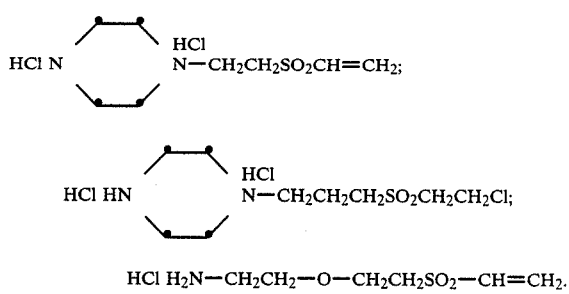

HCl H$_2$N—CH$_2$CH$_2$—O—CH$_2$CH$_2$SO$_2$—CH=CH$_2$.

EXAMPLE 23

Replacing the 18.5 parts of cyanuric chloride in Examples 20 to 22 by a molar amount of one of the 1,3,5-triazine derivatives mentioned hereinafter likewise affords useful dyes according to the invention: tribromotriazine, trifluorotriazine, trisulfotriazine, tris-methylsulfonyltriazine, tris-ethylsulfonyltriazine, tris-phenylsulfonyltriazine, dichlorofluorotriazine, chloro-disulfotriazine, chloro-bis-methylsulfonyltriazine.

Similar useful reactive dyes according to the invention can be obtained by repeating Example 23 on the condensation products with cyanuric chloride of the azo dyes obtainable from the diazo and coupling components indicated in the table below instead of on the intermediate dyes used above.

Diazo components

3-Aminobenzenesulfonic acid, 4-aminobenzenesulfonic acid, 5-chloro-2-aminobenzenesulfonic acid, 2,5-dichloro-4-aminobenzenesulfonic acid, 2-aminotoluene-4-sulfonic acid, 4-aminotoluene-3-sulfonic acid, 2-aminoanisole-4-sulfonic acid, 4-aminobenzene-1,3-disulfonic acid, 2-aminobenzene-1,4-disulfonic acid, 2-aminotoluene-3,5-disulfonic acid, 2-aminonaphthalene-1,5-disulfonic acid, 2-aminonaphthalene-4,8-disulfonic acid, 2-aminonaphthalene-6,8-disulfonic acid, 2-aminonaphthalene-1-sulfonic acid, 2-aminonaphthalene-6-sulfonic acid, 4-$\beta$-ethylsulfonylaniline, 3-$\beta$-chloroethylsulfonylaniline, 2-methoxy-4-$\beta$-sulfatoethylsulfonylaniline, 2-methoxy-5-methyl-4-$\beta$-sulfatoethylsulfonylaniline, 2-bromo-4-$\beta$-sulfatoethylsulfonylaniline, 2-sulfo-4$\beta$-sulfatoethylsulfonylaniline, 2-methoxy-5-$\beta$-sulfatoethylsulfonylaniline, 2-sulfo-5-$\delta$-($\beta$-chloroethylsulfonylbutyryl-aminoaniline, 2-amino-8-$\beta$-sulfatoethylsulfonylnaphthalene-5-sulfonic acid, 2-amino-8-$\beta$-sulfatoethylsulfonylnaphthalene, 2-amino-6-vinylsulfonylnaphthalene-1-sulfonic acid.

Coupling components 1-(3'-Amino-6'-sulfophenyl)-3-methyl-5-pyrazolone, 1-(4'-amino-3'-sulfophenyl)-3-methyl-5-pyrazolone, 1-(4'-amino-2'-sulfophenyl)-3-methyl-5-pyrazolone, 1-(3'-amino-6'-sulfophenyl)-5-pyrazolone-3-carboxylic acid, 1-(4'-amino-3'-sulphophenyl)-5-pyrazolone-3-carboxylic acid, 1-(3'-amino-5'-sulfo-6'-methylphenyl)-5-pyrazolone-3-carboxylic acid, 1-(2'-methyl-3'-amino-5'-sulfophenyl)-5-pyrazolone-3-carboxylic acid, 1-(2'-methyl-3'-amino-5'-sulfophenyl)-3-methyl-5-pyrazolone, 1-(3'-amino-5'-sulfo-6'-methylphenyl)-3-methyl-5-pyrazolone, 1-(4'-amino-2',5'-disulfophenyl)-5-pyrazolone-3-carboxylic acid.

EXAMPLE 24, 50.3 parts of the monoazo dye 1-(5'-amino-2'-sulfophenylazo)-2-naphthol-6,8-disulfonic acid are reacted, initially at 0°–5° and at pH 6–6.5, with a suspension of 18.5 parts of cyanuric chloride, prepared by dissolving the cyanuric chloride in 100 parts of acetone and precipitating with 250 g of ice, and then at 30°–40° and at pH 4.0–4.5 with 26 parts of HCl H$_2$NCH$_2$CH$_2$OCH$_2$CH$_2$SO$_2$CH$_2$CH$_2$Cl. The resulting orange reactive dye of the formula

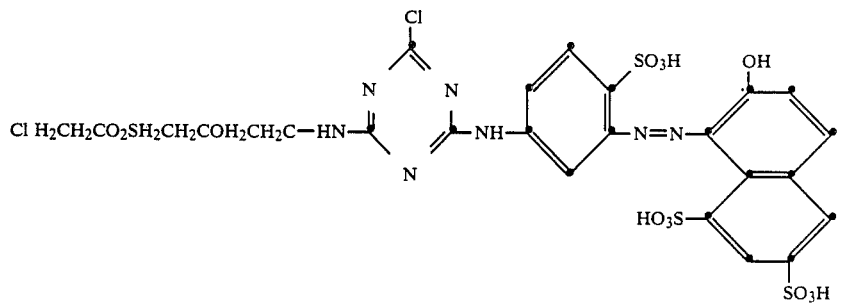

is evaporated to dryness at 55°–60° in vacuo from the neutral solution or is precipitated with sodium chloride, filtered off and dried in vacuo.

The starting dye 1-(5'-amino-2'-sulfophenylazo)-2-naphthol-6,8-disulfonic acid is obtained by coupling diazotized 2-amino-4-acetaminobenzenesulfonic acid with 2-naphthol-6,8-disulfonic acid and subsequently hydrolyzing the acetyl group with sodium hydroxide solution or hydrochloric acid.

Similar useful reactive dyes according to the invention are obtained by repeating the above example on amino-containing monoazo dyes prepared from the diazo and coupling components given hereinafter with subsequent hydrolysis of the acetyl group or reduction of the nitro group. Diazo components 2-amino-5-acetaminobenzenesulfonic acid, 2-amino-4-acetaminotoluene-5-sulfonic acid, 2-amino-4-acetaminotoluene-6-sulfonic acid, 2-amino-6-acetaminotoluene-4-sulfonic acid, 5-nitro-2-aminobenzenesulfonic acid, 6-acetamino-2-aminonaphthalene-4,8-disulfonic acid, 4-nitro-2-aminotoluene-6-sulfonic acid, 6-nitro-4-aminotoluene-2-sulfonic acid, 6-nitro-2-aminonaphthalene-8-sulfonic acid, 6-nitro-2-aminonaphthalene-4,8-disulfonic acid, 1-amino-3-aminomethylbenzene-6-sulfonic acid, 2-amino-5-aminomethylnaphthalene-1-sulfonic acid.

Coupling components

1-Naphthol-3,6-disulfonic acid, 1-naphthol-3,8-disulfonic acid, 1-naphthol-3,7-disulfonic acid, 2-naphthol-3,7-disulfonic acid, 2-naphthol-4,8-disulfonic acid, 1-naphthol-3,6,8-trisulfonic acid, 2-naphthol-3,6,8-trisulfonic acid, 2-aminonaphthalene-3,6-disulfonic acid, 2-aminonaphthalene-5,7-disulfonic acid, 1-(2'- or 3'- or 4'-sulfophenyl)-3-methyl-5-pyrazolone, 1-(2'-methyl-4'-sulfophenyl)-3-methyl-5-pyrazolone, 1-(2',5'-dichloro-4'-sulfophenyl)-3-methyl-5-pyrazolone, 1-(2',5'-disulfophenyl)-3-methyl-5-pyrazolone, 1-(2'- or 3'- or 4'-sulfophenyl)-5-pyrazolone-3-carboxylic acid, 1-(2'-chloro-5'-sulfophenyl)-5-pyrazolone-3-carboxylic acid, 1-ethyl-3-sulfomethyl-4-methyl-6-hydroxypyrid-2-one, 1-ethyl-3-carbamoyl-4-methyl-6-hydroxypyrid-2-one, 1-ethyl-3-cyano-4-methyl-6-hydroxypyrid-2-one, 1-alkanoylamino-8-hydroxynaphthalene-3,6- or -4,6-disulfonic acid, 1-benzoylamino-8-hydroxynaphthalene-3,6- or -4,6-disulfonic acid.

EXAMPLE 25

Example 24 is repeated except that the 26 parts of HCl H$_2$NCH$_2$CH$_2$OCH$_2$CH$_2$SO$_2$CH$_2$CH$_2$Cl are replaced by a molar amount of the hydrochloride of one of the amines mentioned below, likewise affording useful dyes according to the invention:

β,γ-(bis-β'-chloroethylsulfonyl)-propylamine hydrochloride, α-carboxy-β-(β'-chloroethylsulfonyl)-ethylamine hydrochloride, β-hydroxy-γ-(β'-chloroethylsulfonyl)-propylamine hydrochloride,

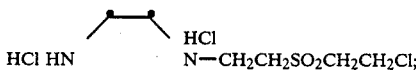

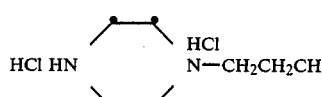

EXAMPLE 26

Replacing the 18.5 parts of cyanuric chloride in Examples 24 and 25 by a molar amount of one of the 1,3,5-triazine derivatives mentioned below likewise affords useful dyes according to the invention: tribromotriazine, trifluorotriazine, trisulfotriazine, tris-methylsulfonyltriazine, tris-ethylsulfonyltriazine, tris-phenylsulfonyltriazine, dichlorofluorotriazine, chloro-disulfotriazine, chloro-bis-methylsulfonyltriazine.

EXAMPLE 27

50.3 parts of the dye 1-amino-4-(3'-amino-4'-methyl-5'-sulfophenylamino)-anthraquinone-2-sulfonic acid are dissolved under neutral conditions with water and the required amount of sodium carbonate. This solution is added at 0°–5° to a suspension of 18.5 parts of cyanuric chloride, prepared by dropwise addition of a solution of the cyanuric chloride in 110 parts of acetone to 250 parts of ice. The hydrogen chloride formed in the reaction is neutralized by the dropwise addition of 50 parts of 2N sodium carbonate solution, the result being a pH of 6–6.5. 26 parts of HCl H$_2$NCH$_2$CH$_2$OCH$_2$CH$_2$—SO$_2$CH$_2$CH$_2$Cl are then added, and the mixture is raised to 30°–40° and is held at this temperature for 3 hours. At the same time the pH is held at 4.0–4.5 by the dropwise addition of 100 parts of 2N sodium carbonate solution. The synthesized reactive dye of the formula

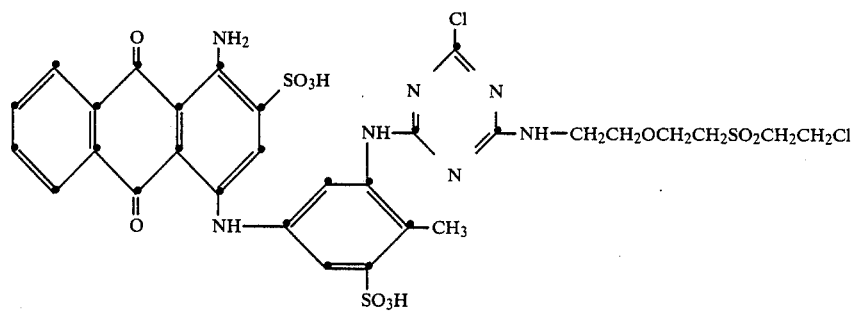

is salted out with sodium chloride, is filtered off and is dried at 55°–60°.

Similar useful dyes according to the invention are obtained when Example 27 is repeated on dyes of the following table and not on the starting dye 1-amino-4-(3'-amino-4'-methyl-5'-sulfophenylamino)-anthraquinone-2-sulfonic acid.

Intermediate dyes

1-Amino-4-(3'-amino-4'-sulfophenylamino)-anthraquinone-2-sulfonic acid 1-amino-4-(4'-amino-3'-sulfophenylamino)-anthraquinone-2-sulfonic acid 1-amino-4-(3'-amino-2'-methyl-5'-sulfophenylamino)-anthraquinone-2-sulfonic acid 1-amino-4-(4'-amino-2',2''-disulfodiphen-4''-ylamino)-anthraquinone-2-sulfonic acid 1-amino-4-(3'-amino-4'-methyl-5'-sulfophenylsulfonylphen-3''-ylamino)-anthraquinone-2-sulfonic acid 1-amino-4-(4'-aminophenylamino)-anthraquinone-2,5-disulfonic acid 1-amino-4-(4''-amino-2',2''-disulfostilb-4'-ylamino)-anthraquinone-2-sulfonic acid.

EXAMPLE 28

Example 27 is repeated, except that a molar amount of the hydrochloride of one of the amines mentioned below is used in place of the 26 parts of HCl H$_2$NCH$_2$CH$_2$OCH$_2$CH$_2$SO$_2$CH$_2$CH$_2$Cl, likewise affording useful dyes according to the invention:

β,γ-(bis-(β'-chloroethylsulfonyl)-propylamine hydrochloride

α-ethoxycarbonyl-β-(β'-chloroethylsulfonyl)-ethylamine hydrochloride

β-hydroxy-γ-(β'-chloroethylsulfonyl)-propylamine hydrochloride

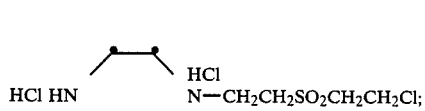

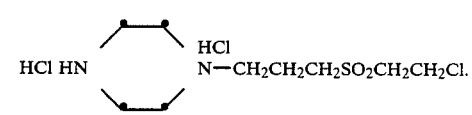

EXAMPLE 29

Replacing the 18.5 parts of cyanuric chloride in Examples 27 and 28 by a molar amount of one of the 1,3,5-triazine derivatives mentioned hereinafter likewise affords useful dyes according to the invention: tribromotriazine, trifluorotriazine, trisulfotriazine, tris-methylsulfonyltriazine, tris-ethylsulfonyltriazine, tris-phenylsulfonyltriazine, dichlorofluorotriazine, chloro-disulfotriazine, chloro-bis-methylsulfonyltriazine.

EXAMPLE 30

106.6 parts of the dye 3-(3'-amino-4'-sulfophenylaminosulfonyl) -copper-phthalocyanine-3", 3''',3''''-trisulfonic acid are dissolved under neutral conditions with water and the required amount of sodium carbonate. This solution is added at 0° to 5° to a suspension of 18.5 parts of cyanuric chloride, prepared by the dropwise addition of a solution of the cyanuric chloride in 110 parts of acetone to 250 parts of ice. During the reaction the pH is maintained at 6 to 6.5 by the dropwise addition of 50 ml of 2N sodium carbonate solution. 32 parts of

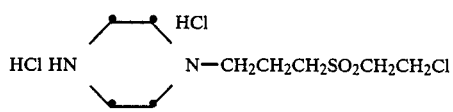

are added to the intermediate obtained, and the mixture is heated to 35° to 45° for 4 hours. At the same time the pH is maintained at 4.0 to 4.5 by the dropwise addition of 100 parts of 2N sodium hydroxide solution. The synthesized reactive dye has the following structure:

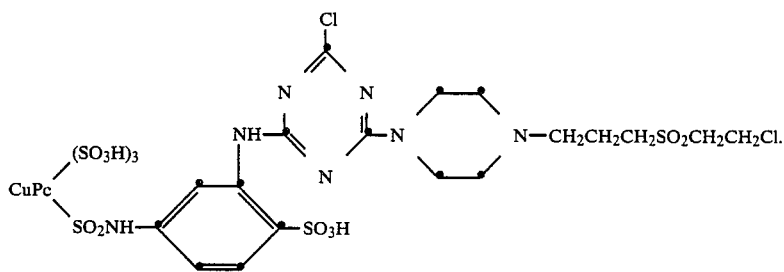

It is precipitated with sodium chloride, is filtered off and is dried at 55°-60° in vacuo.

The starting dye 3-(3'-amino-4'-sulfophenylaminosulfonyl) -copper-phthalocyanine-3",3''',3''''-trisulfonic acid can be prepared at pH 5-9 by reacting copper-phthalocyanine tetrasulfochloride with 2,4-diaminobenzenesulfonic acid in the presence of pyridine.

Similarly useful dyes according to the invention are obtained when the starting dyes used have been prepared not with 2,4-diaminobenzenesulfonic acid but with 2,4-diaminotoluene-6-sulfonic acid, 2,5-diaminobenzenesulfonic acid, 2,6-diaminotoluene-4-sulfonic acid, 4,4'-diaminodiphenyl-2,2'-disulfonic acid or 5-(3'-aminophenyl)sulfonyl-4-methyl-3-aminobenzenesulfonic acid and otherwise the reaction with cyanuric chloride and α-carboxy-β-chloroethylsulfonylethylamine hydrochloride is carried out as described above.

Furthermore, similarly useful reactive dyes according to the invention are obtained by starting not from copper-phthalocyanine dyes but from corresponding nickel-phthalocyanine dyes.

EXAMPLE 31

Example 30 is repeated, except that the 32 parts of

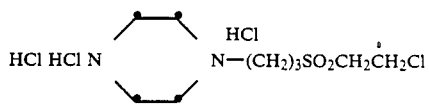

are replaced by a molar amount of the hydrochloride of one of the amines mentioned hereinafter, likewise affording useful dyes according to the invention:

β,γ-(bis-β'-chloroethylsulfonyl)-propylamine hydrochloride

α-ethoxycarbonyl-β-(β'-chloroethylsulfonyl)-ethylamine hydrochloride

β-hydroxy-γ-(β'-chloroethylsulfonyl)-propylamine hydrochloride

HCl H₂NCH₂CH₂OCH₂CH₂SO₂CH₂CH₂Cl;

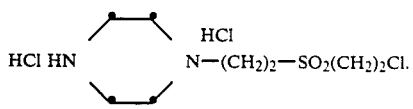

EXAMPLE 32

58.1 parts of the copper complex dye prepared by diazotization of 2-aminophenol-4,6-disulfonic acid and coupling onto 2-amino-5-naphthol-7-sulfonic acid with subsequent coppering in acetic acid solution are dissolved in water under neutral conditions. This solution of dye is added at 0°-5° to a suspension of 18.5 parts of cyanuric chloride, prepared by dissolving the cyanuric chloride in 110 parts of acetone and adding the solution dropwise to 250 parts of ice. During the reaction the pH is maintained at 4.5-5.5 by the dropwise addition of 50 parts of 2N sodium carbonate solution. The mixture is stirred at 0°-5° for 1-2 hours until the reaction is complete. 26 parts of HCl H₂NCH₂CH₂OCH₂CH₂SO₂CH₂CH₂Cl are then added, the mixture is heated to about 45°, and the pH is maintained at 4.5-5.0 by the addition of 100 parts of 2N sodium carbonate solution a little at a time. The resulting ruby red reactive dye has the following formula:

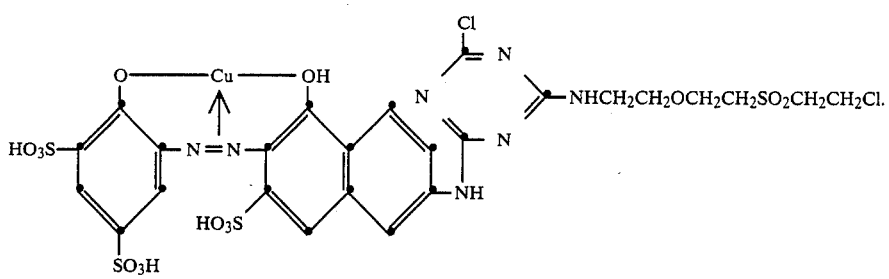

It is precipitated with sodium chloride, is filtered off and is dried at 55°–60°.

Similarly useful reactive dyes according to the invention are obtained when the starting dyes used are the copper complex dyes of the dyes prepared from the following diazo and coupling components and of the copper complex dye of 2-aminophenol-4,6-disulfonic acid and 2-amino-5-naphthol-7-sulfonic acid.

Diazo components

2-Aminophenol-4-sulfonic acid
2-aminophenol-5-sulfonic acid
6-nitro-2-aminophenol-4-sulfonic acid
4-nitro-2-aminophenol-6-sulfonic acid
4-chloro-2-aminophenol-6-sulfonic acid
2-amino-4-methylphenol-6-sulfonic acid
2-amino-4-acetaminophenol-6-sulfonic acid
1-amino-2-naphthol-4-sulfonic acid
6-nitro-1-amino-2-naphthol-4-sulfonic acid

Coupling components

1-Amino-5-naphthol-7-sulfonic acid
1-amino-8-naphthol-4-sulfonic acid
1-amino-8-naphthol-6-sulfonic acid
2-(N-methylamino)-5-naphthol-7-sulfonic acid
2-(N-ethylamino)-5-naphthol-7-sulfonic acid
2-(N-β-hydroxyethylamino)-5-naphthol-7-sulfonic acid
2-amino-8-naphthol-6-sulfonic acid
2-(N-methylamino)-8-naphthol-6-sulfonic acid
2-(N-ethylamino)-8-naphthol-6-sulfonic acid
2-amino-8-naphthol-3,6-disulfonic acid
1-amino-8-naphthol-4,6-disulfonic acid
2-amino-5-naphthol-1,7-disulfonic acid
2-amino-8-naphthol-3,6-disulfonic acid.

EXAMPLE 33

Example 32 is repeated, except that the 26 parts of HCl H$_2$N(CH$_2$)$_2$O(CH$_2$)$_2$SO$_2$(CH$_2$)$_2$Cl are replaced by a molar amount of the hydrochloride of one of the amines mentioned below, likewise affording useful dyes according to the invention:

β, γ-(bis-β′-chloroethylsulfonyl)-propylamine hydrochloride
α-ethoxycarbonyl-β-(β′-chloroethylsulfonyl)-ethylamine hydrochloride
β-hydroxy-γ-(β′-chloroethylsulfonyl)-propylamine hydrochloride

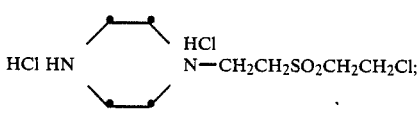

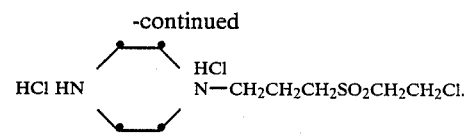

EXAMPLE 34

Replacing the 18.5 parts of cyanuric chloride in Examples 33 and 34 by a molar amount of one of the 1,3,5-triazine derivatives mentioned below likewise affords useful dyes according to the invention: tribromotriazine, trifluorotriazine, trisulfotriazine, tris-methylsulfonyltriazine, tris-ethylsulfonyltriazine, tris-phenylsulfonyltriazine, dichlorofluorotriazine, chloro-disulfotriazine, chloro-bis-methylsulfonyltriazine.

EXAMPLE 35

31 parts of

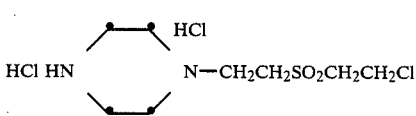

are added in the form of a powder to a suspension of 79.4 parts of the copper complex of 7-[6′-(2″,4″-dichloro-1″,3″,5″-triazinylamino)-2′-hydroxy-4′-sulfo-1′-naphthylazo]-1-amino-8-hydroxynaphthalene-2,4-disulfonic acid in about 800 parts of water at 0-5° and pH 6.5. The mixture is heated to 30-40° and is maintained at that temperature for 4 hours. At the same time the pH is maintained at 4.0–4.5 by the dropwise addition of 100 parts of 2N sodium carbonate solution. The end of the reaction is evident from the fact that the pH remains constant at 4.5. The synthesized blue reactive dye has the following structure:

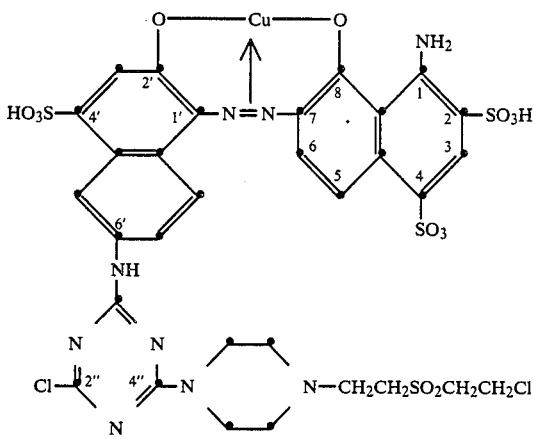

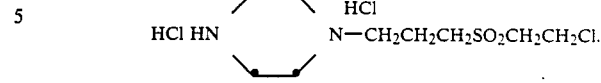

It is either evaporated to dryness at 55°–60° in vacuo or is precipitated with sodium chloride.

Similarly useful reactive dyes according to the invention are obtained when the 6-nitro-1-diazo-4-sulfonaphtholate is replaced by the diazo compounds of the following amines: 4-nitro-2-amino-1-hydroxynaphthalene-6-sulfonic acid, 6-nitro-2-aminophenol-4-sulfonic acid, 4-nitro-2-aminophenol-6-sulfonic acid.

EXAMPLE 36

Example 35 is repeated, except that the 36 parts of

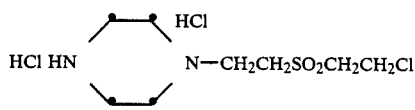

are replaced by a molar amount of the hydrochloride of one of the amines mentioned hereinafter, likewise affording useful dyes according to the invention: β,γ-(bis-β'-chloroethylsulfonyl)-propylamine hydrochloride, α-ethoxycarbonyl-β-(β'-chloroethylsulfonyl)-ethylamine hydrochloride, β-hydroxy-γ-(β'-chloroethylsulfonyl)-propylamine hydrochloride, HCl H$_2$NCH$_2$CH$_2$OCH$_2$CH$_2$SO$_2$CH$_2$CH$_2$Cl;

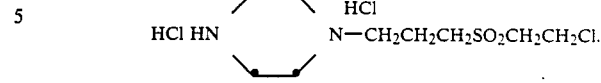

EXAMPLE 37

Replacing the 79.4 parts of the copper complex of 7-[6'-(2'',4''-dichloro-1'',3'',5''-triazinylamino)-2'-hydroxy-4'-sulfo-1'-naphthylazo]-1-amino-8-hydroxynaphthalene-2,4-disulfonic acid in Examples 35 and 36 by 76.1 parts of 7-[6'-(2'',4''-difluoro-1'',3'',5''-triazinylamino)-2'-hydroxy-4'-sulfo-1'-naphthylazo]-1-amino-8-hydroxynaphthalene-2,4-disulfonic acid likewise affords useful dyes according to the invention.

EXAMPLE 38

26 parts of HCl H$_2$NCH$_2$CH$_2$OCH$_2$CH$_2$SO$_2$CH$_2$CH$_2$Cl in powder form are added to a neutral suspension of 82.4 parts of the copper complex of N-(2-hydroxy-4-sulfophenyl)N'-(2'-carboxy-4'-sulfophenyl)-ms-[4''-(2''',4'''-dichloro-1''',3''',5'''-triazinylamino)-2''-sulfophenyl]-formazan in about 800 parts of water at about 0-5°. The mixture is then heated at 30°–40° for 4 hours during which the pH is maintained at 4.0–4.5 by the addition of dilute sodium hydroxide solution a little at a time. When no more sodium hydroxide solution is required since the pH remains constant, the synthesized blue reactive dye is isolated by spray-drying at 55°–60° or by salting out. It has the following structure:

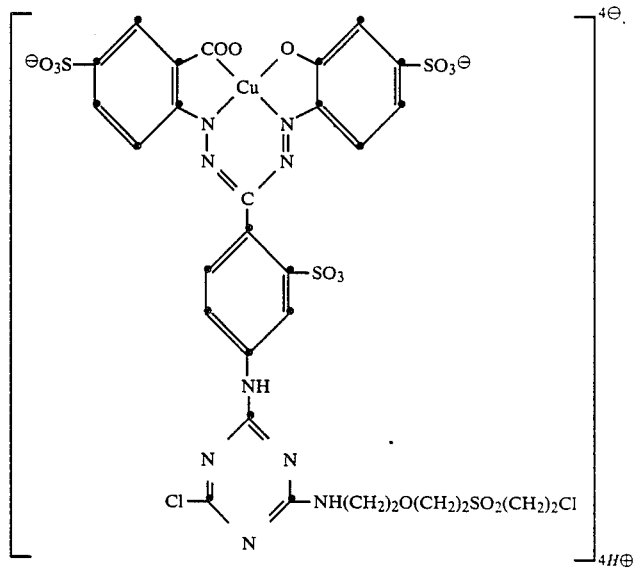

The starting dye copper complex of N-(2-hydroxy-4-sulfophenyl) -N'-(2''-carboxy-4''-sulfophenyl)-ms-[4''-(2''',4'''-dichloro- 1''',3''',5'''-triazinylamino)-2-sulfophenyl]-formazan is obtained as follows: 46.4 parts of 2-carboxyphenylhydrazine-4-sulfonic acid and 48.6 parts of 4-acetaminobenzaldehyde-2-sulfonic acid are condensed in aqueous solution, and the resulting hydrazone is coupled at 0°–5° in the presence of sodium carbonate with the diazo compound of 37.8 parts of 1-amino-2-hydroxybenzene-4-sulfonic acid. The resultant formazan is brought to pH 5-5.3 with acetic acid and is converted into the copper complex by heating for 5 hours at 40°-50° in the presence of copper-donating agents, for example 40 parts of copper acetate or 50 parts of copper sulfate. This copper complex is precipitated with sodium chloride and is dissolved in about 800 ml of water under neutral conditions. The solution of dye is added at 0°-5° to a suspension of 37.0 parts of cyanuric chloride, prepared by dissolving the cyanuric chloride in 200 parts of acetone and reprecipitating it with 500 parts of ice. The mixture is stirred at 0°-5° for 1-2 hours until the reaction is complete.

Similarly useful reactive dyes according to the invention are obtained when the hydrazine, aldehyde and diazo components given hereinafter are turned into formazans which must contain at least one acetamino group, either in the aldehyde component or the diazo component, the formazans are converted into the copper complex, the acetamino group is hydrolyzed, the dyes are reacted with cyanuric chloride and the rest of the procedure is as described above. The selected components should be such that at least three sulfo groups are present per dye molecule.

If the aldehyde and diazo components contain a hydrolyzable acetamino group each, reactive radicals can be introduced twice into the dye.

Hydrazine components

2-Hydroxyphenylhydrazine, 6-nitro-2-hydroxyphenylhydrazine, 4-chloro-2-carboxyphenylhydrazine, 5-nitro-2-carboxyphenylhydrazine-4-methoxy-2-carboxyphenylhydrazine, 4-nitro-2-hydroxy-6-sulfophenylhydrazine, 6-nitro-2-hydroxy-4-sulfophenylhydrazine, 2-carboxy-5-sulfophenylhydrazine, 2-hydroxy-6-carboxy-4-sulfophenylhydrazine, 2-hydroxy-4,6-disulfophenylhydrazine, 2-hydroxy-4-sulfonaphthylhydrazine, 2-hydroxy-4,6'-disulfonaphthyl-1-hydrazine, 2-carboxy-4-acetaminophenylhydrazine.

Aldehyde components

Benzaldehyde, 4-methylbenzaldehyde, benzaldehyde-2- or -3-or -4-sulfonic acid, benzaldehyde-2,4-disulfonic acid, 2- or 3- or 4-nitrobenzaldehyde, 2-chlorobenzaldehyde-5-sulfonic acid, 2- or 3- or 4-acetaminobenzaldehyde, 3-acetaminobenzaldehyde-4-sulfonic acid, 5-acetaminobenzaldehyde-2-sulfonic acid, benzaldehyde-2-sulfonic acid.

Diazo components

1-Amino-3-acetamino-2-hydroxybenzene-5-sulfonic acid,
1-amino-5-acetamino-2-hydroxybenzene-3-sulfonic acid, 3-chloro-1-amino-2-hydroxybenzene-5-sulfonic acid, 5-nitro-1-amino-2-hydroxybenzene-3-sulfonic acid, 5-nitro-1-amino-2-hydroxybenzene-4-sulfonic acid, 1-amino-2-hydroxybenzene-4,6-disulfonic acid, 3-chloro-1-amino-2-hydroxybenzene-5-sulfonic acid, 5-nitro-1-amino-2-hydroxybenzene-3-sulfonic acid, 5-nitro-1-amino-2-hydroxybenzene-4-sulfonic acid, 1-amino-2-hydroxybenzene-4,6-disulfonic acid, 1-amino-2-hydroxybenzene-3,5-disulfonic acid.

EXAMPLE 39

Example 38 is repeated, except that the 26 parts of HCl H₂N(CH₂)₂O(CH₂)₂SO₂(CH₂)₂Cl are replaced by a molar amount of the hydrochloride of one of the amines mentioned below, likewise affording useful dyes according to to the invention: β,γ-(bis-β'-chloroethylsulfonyl)-propylamine hydrochloride, γ-ethoxycarbonyl-β-(β'-chloroethylsulfonyl)ethylamine hydrochloride, ρ-hydroxy-γ-(β'-chloroethylsulfonyl-propylamine hydrochloride,

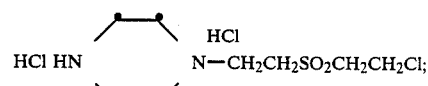

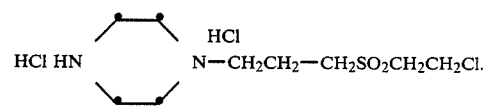

EXAMPLE 40

Replacing the 82.4 parts of the copper complex of N-(2-hydroxy-4-sulfophenyl)-N'-(2'-carboxy-4'-sulfophenyl)-ms -[4''-(2''', 4'''-dichloro-1''',3''',5'''-triazinylamino)-2''-sulfophenyl ]-formazan in Examples 38 and 39 by 79.1 parts of N-(2-hydroxy-4-sulfophenyl)-N'-(2'-carboxy-4'-sulfophenyl)-ms -[4''-(2''',4'''-difluoro-1''',3''',5'''-triazinylamino)-2''-sulfophenyl ]-formazan likewise affords useful dyes according to the invention.

EXAMPLE 41

An aqueous suspension of 52 parts of HCl H₂NCH₂CH₂O—CH₂CH₂SO₂CH₂CH₂Cl is added at 0°14 5° to an aqueous suspension of 81.4 parts of the N,N'-bis-(2,4-dichloro-1,3,5-triazinyl) compound of 7-(5'-amino-2'-sulfophenylazo)-1-amino-8-naphthol-3,6-disulfonic acid. The mixture is heated to 30°-40° and is maintained at that temperature for 3-4 hours, while at the same time a solution of 100 parts of 2N sodium carbonate solution is added dropwise a little at a time in order to maintain a pH of 4.0-4.5. When the pH remains constant, the reaction is complete. The resulting bluish red reactive dye is either evaporated to dryness at 55°-60° in vacuo or precipitated with sodium chloride. It has the following structure:

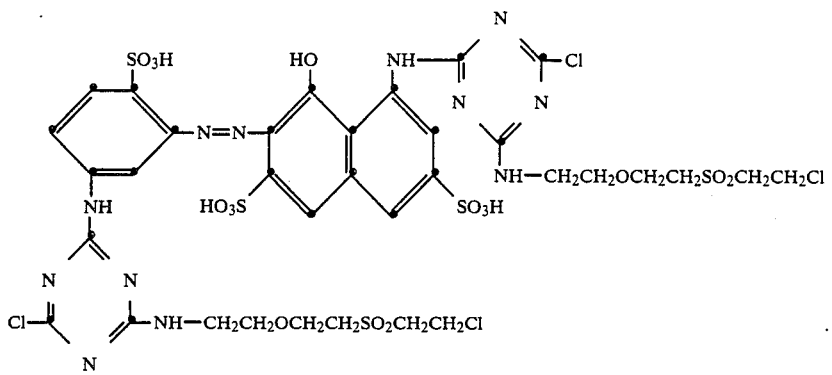

The starting dye N,N'-bis-(2,4-dichloro-1,3,5-triazinyl) compound of 7-(5'-amino-2'-sulfophenylazo)-1-amino-8-naphthol-3,6-disulfonic acid is obtained as follows: a neutral solution of 37.6 parts of 2,4-diaminobenzenesulfonic acid is reacted with a suspension of 37.0 parts of cyanuric chloride at a temperature of 0°–5° and pH 6–7, as is a neutral solution of 63.8 parts of 1-amino-8-naphthol-3,6-disulfonic acid with a suspension of 37.0 parts of cyanuric chloride. In both cases the pH of 6–7 is maintained by the dropwise addition of 100 parts of 2N sodium carbonate solution in each case. The diazo component 2-amino-5-(2'',4''-dichloro-1'',3'',5''-triazinylamino)-benzenesulfonic acid is diazotized in a conventional manner at 0°–5° with sodium nitrite in hydrochloric acid solution, and the diazonium compound is combined with the coupling component 1-(2''',4'''-di-chloro-1''',3''',5'''-triazinylamino)-8-naphthol-3,6-disulfonic acid to give the monoazo dye.

Similarly useful reactive dyes according to the invention are obtained on using in the preparation of the starting dye in place of the condensation product of 1-amino-8-naphthol-3,6-disulfonic acid with cyanuric chloride the condensation products with cyanuric chloride of the coupling components mentioned in Example 1 and otherwise proceeding as described above.

Replacing the condensation product of 2,4-diaminobenzenesulfonic acid with cyanuric chloride, used as diazo component in the preparation of the starting dye, by the corresponding condensation products of cyanuric chloride with 2,5-diaminobenzenesulfonic acid or 2,5-diaminobenzene-1,4-disulfonic acid and otherwise proceeding as described above, this likewise produces useful dyes according to the invention.

EXAMPLE 42

Example 41 is repeated, except that the 52 parts of HCl H$_2$N(CH$_2$)$_2$O(CH$_2$)$_2$SO$_2$(CH$_2$)$_2$Cl are replaced by a molar amount of the hydrochloride of one of the amines mentioned below, likewise affording useful dyes according to the invention: β,γ-(bis-β'-chloroethylsulfonyl)-propylamine hydrochloride, α-ethoxycarbonyl β-(β'-chloroethylsulfonyl)ethylamine hydrochloride, α-hydroxy-γ-(β'-chloroethylsulfonyl)-propylamine hydrochloride,

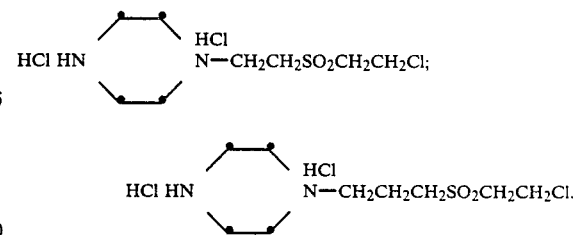

EXAMPLE 43

Replacing the 81.4 parts of N,N'-bis-(3,5-di-chloro-2,4,6triazinyl) compound of 7-(5'-amino-2'-sulfophenylazo)-1-amino-8-naphthol-3,6-disulfonic acid in Examples 41 and 42 by 78.1 parts of N,N'-bis-(2,4-difluoro-1,3,5-triazinyl) compound of 7-(5'-amino-2'-sulfophenylazo)-1-amino-8-naphthol-3,6-disulfonic acid likewise affords useful dyes according to the invention.

EXAMPLE 44

A neutral solution of 72.8 parts of the copper complex of the dye 6-amino-1,2', 8'-trihydroxy-2,1'-azonaphthalene-3',4,6',8-tetrasulfonic acid in 400 parts of water is added at 0°–5° to a suspension of 18.5 parts of cyanuric chloride dissolved in 70 parts of warm acetone and added with stirring to 300 parts of ice. The hydrochloric acid formed in the reaction is neutralized by the dropwise addition of 50 parts of 2N sodium hydroxide solution (pH 5.5–6.5). Thereupon 26 parts of HCl H$_2$NCH$_2$CH$_2$OCH$_2$CH$_2$SO$_2$CH$_2$CH$_2$Cl are added in the form of a powder. The mixture is heated to 40° in the course of about ½ hour and is maintained at that temperature for 3 hours. At the same time the pH is maintained at 4.0–4.5 by the addition of 17 g of sodium bicarbonate. The resultant blue reactive dye of the formula

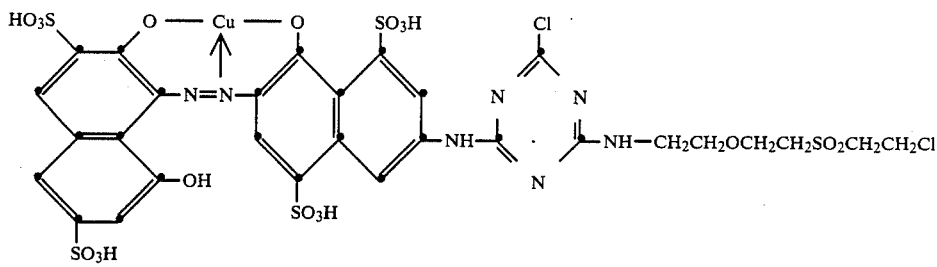

is salted out with sodium chloride, is filtered off and is dried at 60° in vacuo.

The starting material copper complex dye is prepared as follows in accordance with the directions of German Patent No. 1,117,235:

81.8 parts of o-benzenesulfonyl 1-amino-8-naphthol-3,6-disulfonate are diazotized and coupled under alkaline conditions in the presence of sodium carbonate with 72.2 parts of 2-acetamino-5-naphthol-4,8-disulfonic acid. The resulting monoazo dye is converted in a conventional manner into the copper complex by oxidative coppering with copper sulfate and hydrogen peroxide in acetic acid solution, and the benzenesulfonyl and acetyl groups are then split off by hydrolysis.

Replacing the diazo component in the preparation of the starting dye by molar amounts of the diazo components given hereinafter and otherwise proceeding as described above likewise produces useful dyes according to the invention: o-benzenesulfonyl 1-amino-8-naphthol-4,6-disulfonate, o-benzenesulfonyl 1-amino-8-naphthol-4,7-disulfonate, 2-aminonaphthalene-4,8-disulfonic acid, 2-amino-6-nitronaphthalene-4,8-disulfonic acid, 2-aminonaphthalene-4,6,8-trisulfonic acid, 2-aminonaphthalene-6-sulfonic acid, 2-aminonaphthalene-8-sulfonic acid.

Replacing the coupling component 2-acetamino-5-naphthol-4,8-disulfonic acid in the preparation of the starting dye by molar amounts of the N-acetyl compound of the following coupling components likewise produces useful dyes according to the invention: 2-amino-8-naphthol-6-sulfonic acid, 2-amino-5-naphthol-7-sulfonic acid, 2-amino-5-naphthol-1,7-disulfonic acid, 2-amino-8-naphthol-3,6-disulfonic acid.

EXAMPLE 45

Example 40 is repeated, except that the 26 parts of HCl H$_2$N(CH$_2$)$_2$O(CH$_2$)$_2$SO$_2$(CH$_2$)$_2$Cl are replaced by a molar amount of the hydrochloride of one of the amines mentioned hereinafter, likewise affording useful dyes according to the invention: β,γ-(bis-β'-chloroethylsulfonyl)propylamine hydrochloride, α-ethoxycarbonyl-β-(β'-chloroethylsulfonyl)-ethylamine hydrochloride, β-hydroxy-γ-(β'-chloroethylsulfonyl)-propylamine hydrochloride,

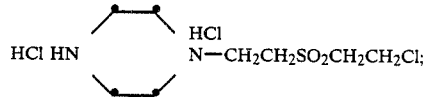

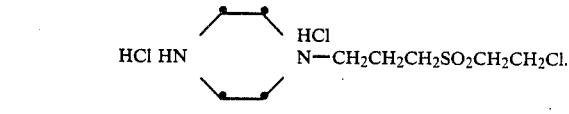

EXAMPLE 46

Replacing the 18.5 parts of cyanuric chloride in Examples 39 and 40 by a molar amount of one of the 1,3,5-triazine derivatives mentioned hereinafter likewise affords useful dyes according to the invention: tribromotriazine, trifluorotriazine, trisulfotriazine, tris-methylsulfonyltriazine, tris-ethylsulfonyltriazine, tris-phenylsulfonyltriazine, dichlorofluorotriazine, chloro-disulfotriazine, chloro-bis-methylsulfonyltriazine.

EXAMPLE 47

70.2 parts of the diazo dye 1-amino-2-(4'-sulfophenylazo)-7-(2''-sulfo-5''-aminophenylazo)-8-naphthol-3,6-di-sulfonic acid are reacted at 0°–5° in the form of a neutral solution with a suspension of 18.5 parts of cyanuric chloride dissolved in 110 parts of acetone and reprecipitated with 250 parts of ice. The reaction takes place at pH 6.0–6.5 maintained by the dropwise addition of 50 parts of 2N sodium carbonate solution. 26 parts of HCl H$_2$NCH$_2$CH$_2$OCH$_2$CH$_2$SO$_2$CH$_2$CH$_2$Cl are then added in the form of a powder, the mixture is heated to 30°–40°, and the pH is maintained at 4.0–4.5 by the dropwise addition of 100 parts of 2N sodium carbonate solution. The resultant dye of the structure:

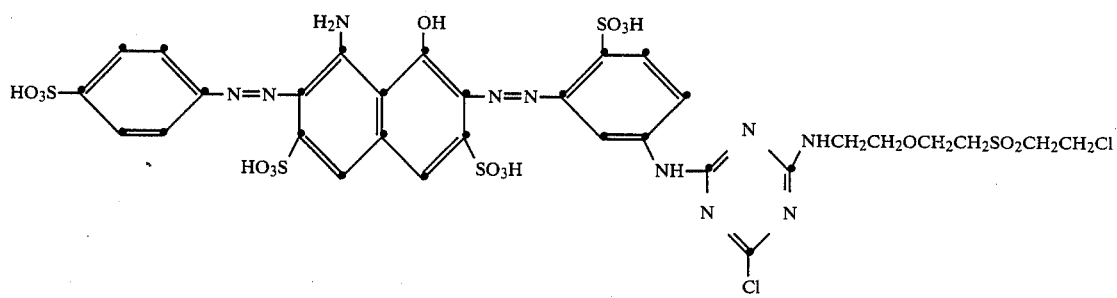

is isolated by salting out or spray-drying.

EXAMPLE 48

81 parts of the diazo dye 1-amino-2-(4'-β-sulfatoethylsulfonylphenylazo)-7-(2'''-sulfo-5'''-aminophenylazo)-8-naphthol-3,6-disulfonic acid are reacted at 0°–5° in the form of a neutral solution with a suspension of 18.5 parts of cyanuric chloride dissolved in 110 parts of acetone and reprecipitated with 250 parts of ice. The reaction takes place at pH 6.0–6.5 maintained by the dropwise addition of 50 parts of 2N sodium carbonate solution. 26 parts of HCl H$_2$NCH$_2$CH$_2$OCH$_2$CH$_2$SO$_2$CH$_2$CH$_2$Cl are then added in the form of a powder, the mixture is heated to 30°–40°, and the pH is maintained at 4.0–4.5 by the dropwise addition of 100 parts of 2N sodium carbonate solution. The resultant dye of the structure:

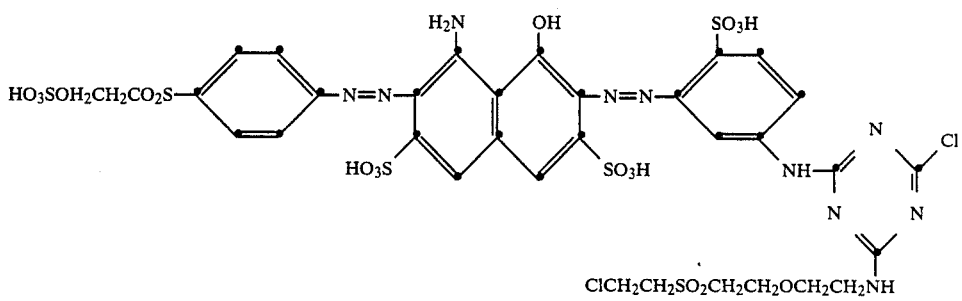

is isolated by salting out or spray-drying.

EXAMPLE 49

81 parts of the diazo dye 8-amino-2-(4'-sulfatoethylsulfonylphenylazo)-7-(2''-sulfo-5''-aminophenylazo)-1naphthol-3,6-disulfonic acid are reacted at 0°–5° in the form of a neutral solution with a suspension of 18.5 parts of cyanuric chloride dissolved in 110 parts of acetone and reprecipitated with 250 parts of ice. The reaction takes place at pH 6.0–6.5 maintained by the dropwise addition of 50 parts of 2N sodium carbonate solution. 26 parts of HCl H$_2$NCH$_2$CH$_2$OCH$_2$CH$_2$SO$_2$CH$_2$CH$_2$Cl are then added in the form of a powder, the mixture is heated to 30°–40°, and the pH is maintained at 4.0–4.5 by the dropwise addition of 100 parts of 2N sodium carbonate solution. The resultant dye of the structure:

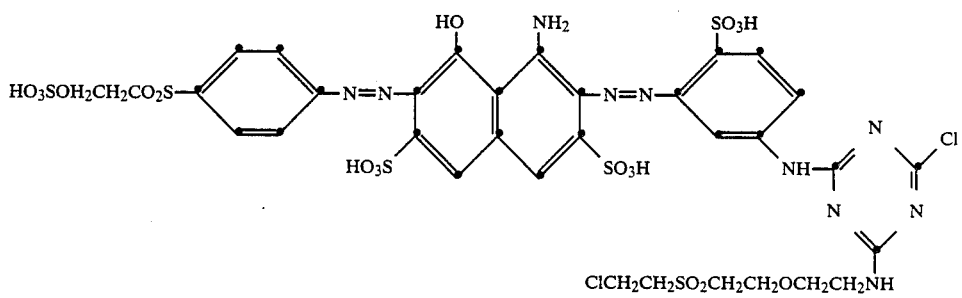

is isolated by salting out or spray-drying.

Similar useful dyes according to the invention are obtained on using the following dyes in place of the diazo dye used as starting dye and otherwise proceeding as described above.

1-Amino-2-(2'-sulfophenylazo)-7-(2''-sulfo-5-aminophenylazo)-8-naphthol-3,6-disulfonic acid
1-amino-2-(2',4'-disulfophenylazo)-7-(2''-sulfo-5''-aminophenylazo)-8-naphthol-3,6-disulfonic acid
1-amino-2-(2',5'-disulfophenylazo)-7-(2'-sulfo-5''-aminophenylazo)-8-naphthol-3,6-disulfonic acid
1-amino-2-(4'-sulfophenylazo)-7-(2''-sulfo-4''-aminophenylazo)-8-naphthol-3,6-disulfonic acid
1-amino-2-(2',5'-disulfophenylazo)-7-(2''-sulfo-4''-aminophenylazo)-8-naphthol-3,6-disulfonic acid
1-amino-2-(2'-sulfo-4'-aminophenylazo)-7-(4''-sulfophenylazo)-8-naphthol-3,6-disulfonic acid
1-amino-2-(2'-sulfo-4'-aminophenylazo)-7-(2'',5''-disulfophenylazo)-8-naphthol-3,6-disulfonic acid
1-amino-2-(2',5'-disulfo-4-aminophenylazo)-7-phenylazo-8-naphthol-3,6-disulfonic acid
1-amino-2-(2'-sulfo-5'-aminophenylazo)-7-(4''-sulfophenylazo)-8-naphthol-3,6-disulfonic acid
1-amino-2-(2'-sulfo-5'-aminophenylazo)-7-(2''-sulfophenylazo)-8-naphthol-3,6-disulfonic acid 8-amino-2-(2'-sulfo-5'-aminophenylazo)-7-(2'',5''-disulfophenylazo)-8-naphthol-3,6-disulfonic acid
8-amino-2-(2'-sulfophenylazo)-7-(2''-sulfo-5''-aminophenylazo)-1-naphthol-3,6-disulfonic acid
8-amino-2-(2',4'-disulfophenylazo)-7-(2''-sulfo-5''-aminophenylazo)-1-naphthol-3,6-disulfonic acid
8-amino-2-(2',5'-disulfophenylazo)-7-(2''-sulfo-5''-aminophenylazo)-1-naphthol-3,6-disulfonic acid
8-amino-2-(4'-sulfophenylazo)-7-(2''-sulfo-4''-aminophenylazo)-1-naphthol-3,6-disulfonic acid
8-amino-2-(2',5'-disulfophenylazo)-7-(2''-sulfo-4''-ethylsulfonylphenylazo)-1-naphthol-3,6-disulfonic acid
8-amino-2-(2'-sulfo-3'-aminophenylazo)-7-(4''-sulfophenylazo)-1-naphthol-3,6-disulfonic acid
8-amino-2-(2'-sulfo-4'-aminophenylazo)-7-(4''-methylsulfonylphenylazo)-1-naphthol-3,6-disulfonic acid 8-amino-2-(2',5'-disulfo-4-aminophenylazo)-7-phenylazo-1-naphthal-3,6-disulfonic acid
8-amino-2-(2'-sulfo-5'-aminophenylazo)-7-(4''-sulfophenylazo)-1-naphthol-3,6-disulfonic acid
8-amino-2-(2'-sulfo-5'-aminophenylazo)-7-(4''-sulfophenylazo)-1-naphthol-3,6-disulfonic acid
8-amino-2-(2'-sulfo-5'-aminophenylazo)-7-(4''-sulfonamidophenylazo)-1-naphthol-3,6-disulfonic acid 1-amino-2-(2'-bromo-4'β-sulfatoethylsulfonyl-phenylazo)-7-(2'-sulfo-5"-aminophenylazo)-8-naphthol-3,6-disulfonic acid 8-amino-2-(2'-bromo-4'-β-ethylsulfonylphenylazo)-7-(2"-sulfo-5"-aminophenylazo)-1-naphthol-3,6-disulfonic acid 8-amino-2-(4'β-sulfatoethylsulfonylphenylazo)-7-(2"-sulfo-4"'-aminophenylazo)-1-naphthol-3,6-disulfonic acid 1-amino-2-(3'-β-ethylsulfonylphenylazo)-7-(2"-sulfo-5"-aminophenylazo)-8-naphthol-3,6-disulfonic acid

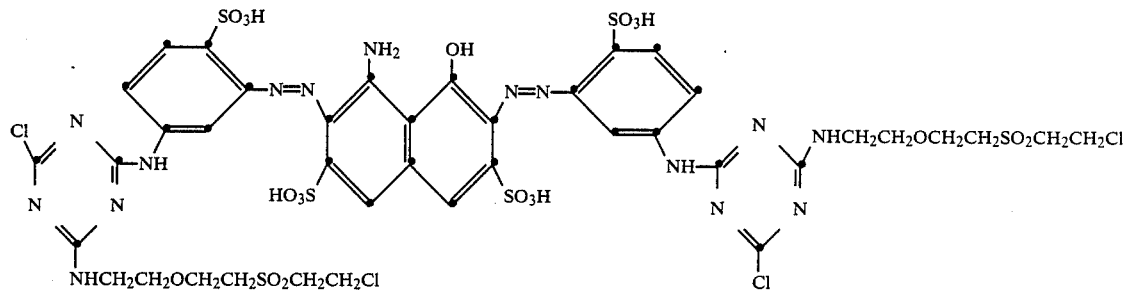

1-amino-2-(4'-β-sulfatoethylsulfonylphenylazo)-7-(2"-sulfo-4"-aminophenylazo)-8-naphthol-3,6-disulfonic acid.

Replacing in the preparation of the abovementioned disazo dyes 1-amino-8-naphthol-3,6-disulfonic acid by 1-amino-8-naphthol-4,6-disulfonic acid and otherwises proceeding as described above likewise affords useful dyes according to the invention.

EXAMPLE 50

Replacing the 26 parts of HCl H₂N(CH₂)₂O(CH₂)₂SO₂(CH₂)₂Cl in Examples 47–49 by a molar amount of the hydrochloride of the amines mentioned hereinafter likewise affords useful dyes according to the invention: β,γ-(bis-β'-chloroethylsulfonyl)-propylamine hydrochloride, α-ethoxycarbonyl-β-(β'-chloroethylsulfonyl)ethylamine hydrochloride, β-hydroxy-γ-(β'-chloroethylsulfonyl)-propylamine hydrochloride

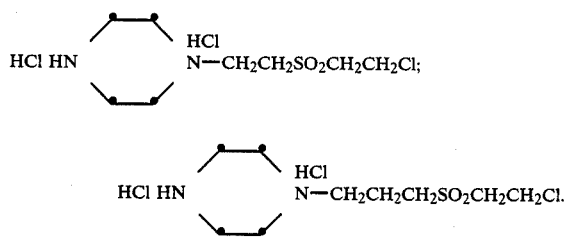

EXAMPLE 51

Replacing the 18.5 parts of cyanuric chloride in Examples 47, 48, 49 and 50 by a molar amount of one of the 1,3,5-triazine derivatives mentioned hereinafter likewise affords useful dyes according to the invention: tribromotriazine, trifluorotriazine, trisulfotriazine, trismethylsulfonyltriazine, tris-ethylsulfonyltriazine, tris-phenylsulfonyltriazine, dichlorofluorotriazine, chlorodisulfotriazine, chloro-bis-methylsulfonyltriazine.

EXAMPLE 52

72.0 parts of the disazo dye 1-amino-2-(2'-sulfo-5'-aminophenylazo)-7-(2"-sulfo-5"-aminophenylazo)-8-naphthol-3,6-disulfonic acid are reacted at 0°–5° in the form of a neutral solution with a suspension of 37 parts of cyanuric chloride dissolved in 110 parts of acetone and reprecipitated with 250 parts of ice. The reaction takes place at pH 6.0–6.5 maintained by the dropwise addition of 100 parts of 2N sodium carbonate solution. 53 parts of HCl H₂NCH₂CH₂OCH₂CH₂SO₂CH₂CH₂Cl are then added in the form of a powder, the mixture is heated to 30°–40°, and the pH is maintained at 4.5–5 by the dropwise addition of 200 parts of 2N sodium carbonate solution. The resultant dye of the structure:

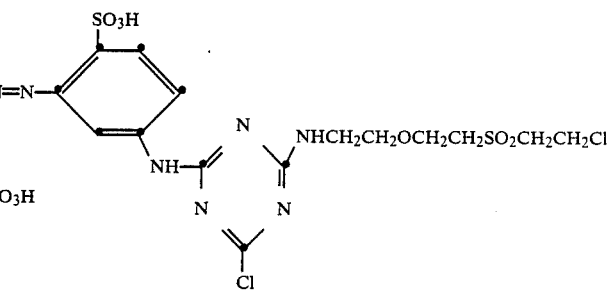

is isolated by salting out or spray-drying.

The disazo dye used as starting material can be prepared as follows:

The disazo compound of 46.0 parts of 2-amino-4-acetaminobenzenesulfonic acid is coupled in a first stage in an acid medium at pH 2–4 with 63.8 parts of 1-amino-8-naphthol-3,6-disulfonic acid and then in a second stage under alkaline conditions in the presence of sodium carbonate with the diazo compound of 46.0 parts of 2-amino-4-acetaminobenzenesulfonic acid. The acetyl groups of the disazo dye are hydrolyzed in the presence of excess sodium hydroxide solution by heating to 90°–100°.

Similarly useful dyes according to the invention are obtained on replacing the diazo dye used as starting dye by the following dyes and otherwise proceeding as described above:

1-amino-2-(2'-sulfo-4'-aminophenylazo)-7-(2"-sulfo-4"-aminophenylazo)-8-naphthol-3,6-disulfonic acid 1-amino-2-(2',5'-disulfo-4'-aminophenylazo)-7-(2",5"-disulfo-4"-aminophenylazo)-8-naphthol-3,6-disulfonic acid 1-amino-2-(2',4'-disulfo-5'-aminophenylazo)-7-(2",4"-disulfo-4"-aminophenylazo)-8-naphthol-3,6-disulfonic acid.

Replacing, in the preparation of the abovementioned disazo dyes, 1-amino-8-naphthol-3,6-disulfonic acid by 1-amino-8-naphthol-4,6-disulfonic acid and otherwise proceeding as described above likewise affords useful dyes according to the invention.

EXAMPLE 53

Example 52 is repeated, except that the 26 parts of HCl H₂N(CH₂)₂O(CH₂)₂SO₂(CH₂)₂Cl are replaced by a molar amount of the hydrochloride of one of the amines mentioned hereinafter, likewise affording useful dyes according to the invention: β,γ-(bis-β'-chloroethylsulfonyl)propylamine hydrochloride, α-ethoxycarbonyl-β-(β'-chloroethylsulfonyl)-ethylamine hydrochloride, β-hydroxy-γ-(β'-chloroethylsulfonyl)-propylamine hydrochloride,

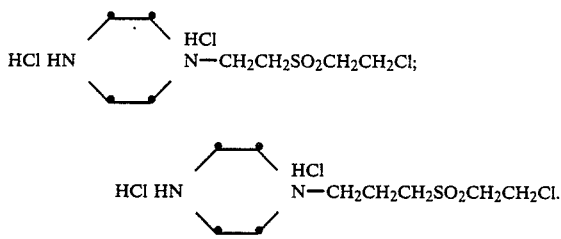

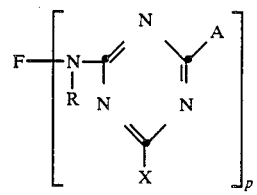

EXAMPLE 54

Replacing the 18.5 parts of cyanuric chloride in Examples 52 and 53 by a molar amount of one of the 1,3,5-triazine derivatives mentioned hereinafter likewise affords useful dyes according to the invention: tribromotriazine, trifluorotriazine, trisulfotriazine, tris-methylsulfonyltriazine, tris-ethylsulfonyltriazine, tris-phenylsulfonyltriazine, dichlorofluorotriazine, chloro-disulfotriazine, chloro-bis-methylsulfonyltriazine.

Dyeing method I 2 parts of the dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

Dyeing method II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

Dyeing method III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

What is claimed is:
1. A reactive dye of the formula

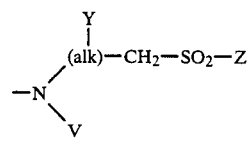

in which:
F is a member selected from the group consisting of metal-free or metal-containing monoazo or disazo dye radicals containing at least one —$SO_3H$ group, an anthraquinone dye radical, a sulfophthalocyanine dye radical, a formazan dye radical, a phenazine dye radical, an oxazine dye radical and a nitroaryl dye radical, R is hydrogen, $C_1$-$C_4$ alkyl which is unsubstituted or substituted with —COOH or —$SO_3H$, cyanoethyl, or hydroxyethyl, X is fluorine, chlorine, bromine, —$SO_3H$, phenylsulfonyl or $C_1$-$C_4$-alkylsulfonyl p is 1 or 2 and A is a radical of the formula

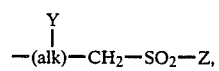

in which:
Y is chlorine, bromine, fluorine, —OH, —$OSO_3H$, —O—acyl, —CN, —COOH, —COO—$C_1$-$C_4$-alkyl, —$CONH_2$ or —$SO_2$—Z, the group designated "alk" is a straight or branched polymethylene radical having 2 to 6 carbon atoms, V is $$-(alk)-CH_2-SO_2-Z,\quad \overset{Y}{\underset{|}{}}$$

hydrogen or $C_1$-$C_4$-alkyl which is unsubstituted or substituted by $C_1$-$C_2$-alkoxy, carboxyl, sulfo, halogen or hydroxy, Z is β-halogenoethyl, vinyl or β-acetoxyethyl, or A is a radical of the formulae

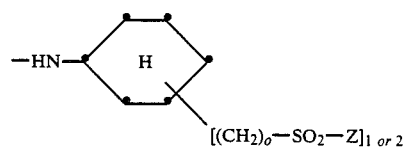

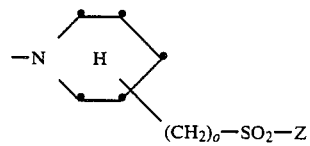

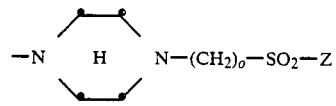

-continued

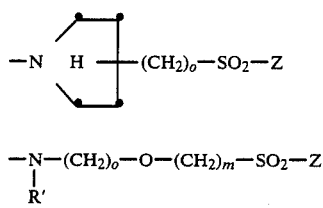

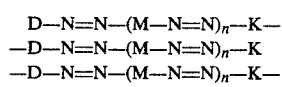

in all of which R' is $C_{1-6}$-alkyl or hydrogen, Z is as defined above, o is 0 to 6, and m is 2 to 6.

2. A reactive dye according to claim 1, wherein F is a monoazo or disazo dye radical of the formula $$D-N=N-(M-N=N)_n-K-$$
$$-D-N=N-(M-N=N)_n-K$$
$$-D-N=N-(M-N=N)_n-K-$$

or a metal complex derived therefrom, wherein

D is a diazo component benzene or naphthalene radical which is unsubstituted or substituted by hydroxyl, methyl, ethyl, methoxy, ethoxy, alkanoylamino having 2 to 4 carbon atoms, benzoylamino, or halogen, K is benzene, naphthalene, pyrazolone, 6-hydroxypyrid-2-one or acetoacetylarylamide radical which is unsubstituted or substituted by hydroxyl, amino, methyl, ethyl, methoxy, ethoxy, alkanoylamino having 2 to 4 carbon atoms, benzoylamino or halogen, M is benzene or naphthalene radical which is unsubstituted or substituted by hydroxyl, methyl, ethyl, methoxy, ethoxy, alkanoylamino having 2 to 4 carbon atoms, benzoylamino or halogen, n is 0 to 1, and D, M and K together contain at least two sulfo groups.

3. A reactive dye according to claim 1 wherein F is an anthraquinone dye radical of the formula

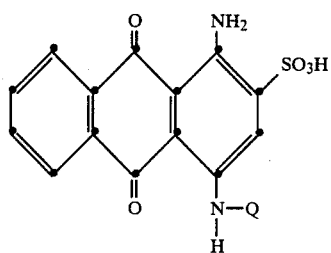

wherein Q is a phenylene radical which is substituted by the group —NR—, and Q or the anthraquinone dye are further unsubstituted or substituted with —SO$_3$H or Q is further substituted by $C_1$-$C_3$-alkoxy, halogen, one to three $C_1$-$C_3$-alkyl groups or —COOH so that the dye contains at least two strongly water-solubilizing groups.

4. A reactive dye according to claim 1, wherein F is a sulfophthalocyanine dye radical substituted by sulfanilide or $C_2$-$C_6$-sulfalkylamide the phthalocyanine nucleus carrying at least two sulfo groups.

5. A reactive dye according to claim 1, wherein F is a phthalocyanine dye radical of the formula

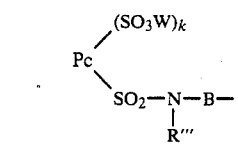

wherein

Pc is a metal-containing or metal-free phthalocyanine radical,

W is —OH or NR'R'',

R', R'' and R''' independently of each other are hydrogen or $C_1$-$C_4$-alkyl,

B is a phenyl radical which is unsubstituted or substituted by halogen, by one to three $C_1$-$C_2$-alkyl groups, or by one or two sulfo or carboxyl groups, or B is an alkyl radical having two to six carbon atoms, and k is one to three.

6. A reactive dye according to claim 5, wherein Pc is a metal-containing phthalocyanine radical in which the metal is copper or nickel.

7. A reactive dye according to claim 5, wherein B is a sulfo-substituted phenylene radical or an ethylene radical.

8. A reactive dye according to claim 1 in which A is a radical of the formula

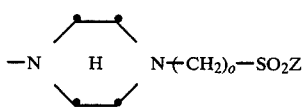

o is 0 to 6, m is 2 to 6, and Z is β-halogenoethyl, vinyl or β-acetoxyethyl.

9. A reactive dye according to claim 8 in which A is a radical of the formula

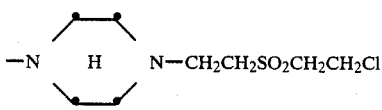

10. A reactive dye according to claim 1 in which A is a radical of the formula

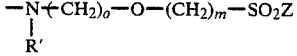

R' is $C_{1-6}$-alkyl or hydrogen, o is 0 to 6, and Z is β-halogenoethyl, vinyl or β-acetoxyethyl.

11. A reactive dye according to claim 10 in which A is a radical of the formula

12. A reactive dye according to claim 10 of the formula

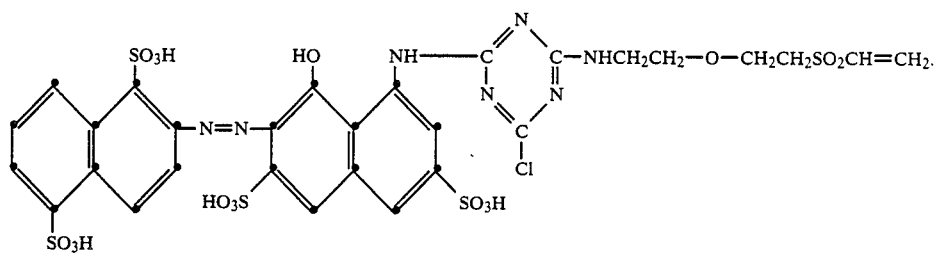
13. A reactive dye according to claim 11 of the formula
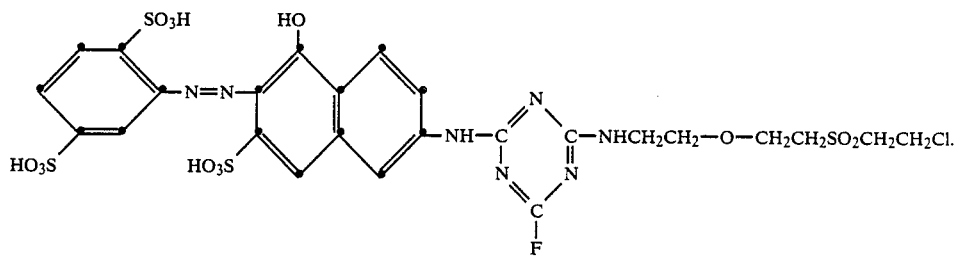
14. A reactive dye according to claim 11 of the formula
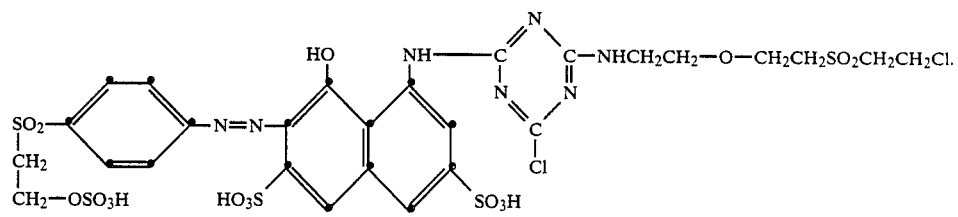
15. A reactive dye according to claim 11 of the formula
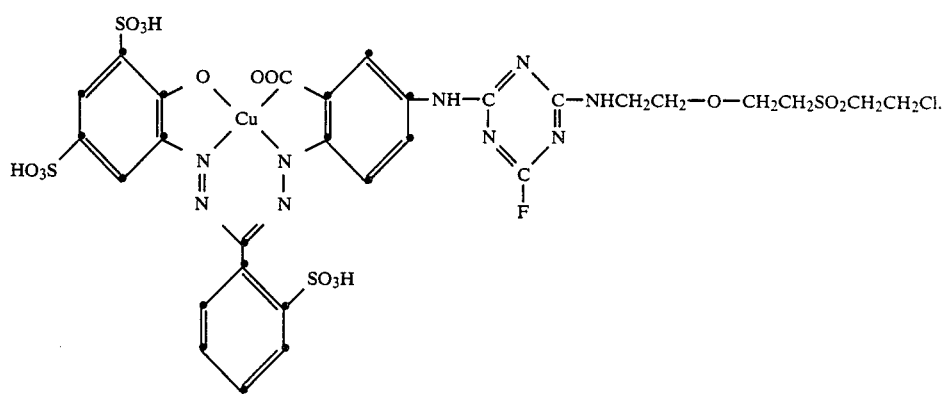
16. A reactive dye according to claim 11 of the formula
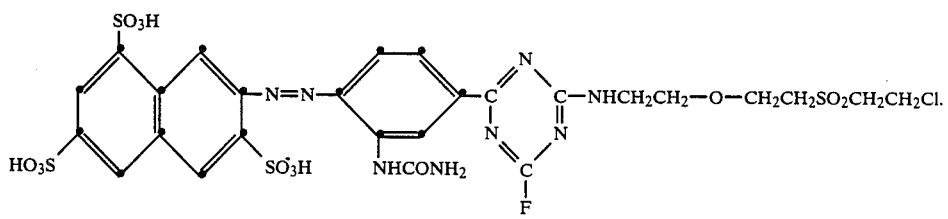
* * * * *